(12) United States Patent
Cooper et al.

(10) Patent No.: US 7,439,663 B2
(45) Date of Patent: Oct. 21, 2008

(54) MICRO-DISCHARGE DEVICES AND APPLICATIONS

(75) Inventors: James Randall Cooper, San Diego, CA (US); Karl H. Schoenbach, Norfolk, VA (US)

(73) Assignee: Ultraviolet Sciences, Inc., San Diego, CA (US)

(*) Notice: Subject to any disclaimer, the term of this patent is extended or adjusted under 35 U.S.C. 154(b) by 809 days.

(21) Appl. No.: 10/747,296

(22) Filed: Dec. 29, 2003

(65) Prior Publication Data

US 2004/0144733 A1  Jul. 29, 2004

Related U.S. Application Data

(60) Provisional application No. 60/438,270, filed on Jan. 2, 2003.

(51) Int. Cl.
 *H01J 1/00* (2006.01)
(52) U.S. Cl. .................................................. 313/356
(58) Field of Classification Search ................ 313/491, 313/495, 631, 618
 See application file for complete search history.

(56) References Cited

U.S. PATENT DOCUMENTS

| | | | |
|---|---|---|---|
| 5,561,348 A | 10/1996 | Schoenbach | 315/169.1 |
| 5,686,789 A | 11/1997 | Schoenbach et al. | 313/491 |
| 5,939,829 A | 8/1999 | Schoenbach et al. | 313/632 |
| 6,016,027 A | 1/2000 | DeTemple et al. | 313/356 |
| 6,072,273 A | 6/2000 | Schoenbach et al. | 313/491 |
| 6,139,384 A | 10/2000 | DeTemple et al. | 445/24 |
| 6,194,821 B1 | 2/2001 | Nakamura | |
| 6,194,833 B1 | 2/2001 | DeTemple et al. | 313/631 |
| 6,201,355 B1 | 3/2001 | Morgan et al. | |
| 6,346,770 B1 | 2/2002 | Schoenbach et al. | 313/491 |
| 6,398,970 B1 | 6/2002 | Justel et al. | |
| 6,433,480 B1 | 8/2002 | Stark | 313/631 |
| 6,518,692 B2 | 2/2003 | Schoenbach | 313/356 |
| 6,695,664 B2 | 2/2004 | Eden et al. | 445/24 |
| 6,703,771 B2 | 3/2004 | Becker | 313/250 |
| 2002/0089275 A1 | 7/2002 | Falkenstein | |

OTHER PUBLICATIONS

Falkenstein, Dr. Zoran, *Another Route to the Ultraviolet*, Photonics Spectra, Nov. 2001 pp. 108.-113.

B. Gellert and U. Kogelschatz, "Generation of Excimer Emission in Dielectric Barrier Discharges," Appl. Phys. B52, 14 (1991).

U. Kogelschatz, "Silent discharges for the generation of ultraviolet and vacuum ultraviolet excimer radiation," Pure & Appl. Chem. 62, 1667 (1990).

P. Gill and C.E. Webb, "Electron Energy Distribution in the Negative Glow and their Relevance to Hollow Cathode Lasers," J. Phys. D: Appl. Phys. 10, 299 (1977).

(Continued)

*Primary Examiner*—Joseph Williams
(74) *Attorney, Agent, or Firm*—Knobbe Martens Olson & Bear LLP

(57) ABSTRACT

A high pressure gas discharge device and methods of using the device as a UV gas discharge light source are disclosed. The device has a cathode covered partially with a dielectric layer which separates the cathode from an anode. A discharge device utilizes one or more microhollows in the uncovered part of the cathode. Methods of utilizing the discharge devise as a gas discharge light source for producing ultrapure water.

64 Claims, 25 Drawing Sheets

OTHER PUBLICATIONS

E.E. Kunhardt, "Generation of Large-Volume, Atmospheric-Pressure, Nonequilibrium Plasmas," IEEE Trans. Plasma Science 28, 189 (2000).

G. Schaefer and K. H. Schoenbach, "Basic Mechanisms Contributing to the Hollow Cathode Effect" in *Physics and Applications of Pseudosparks*, M. Gundersen and G. Schaefer, eds., Plenum Press, 1990, p. 55.

Karl H. Schoenbach, Ahmed El-Habachi, Mohamed M. Moselhy, Wenhui Shi, and Robert H. Stark, "Microhollow Cathode Discharge Excimer Lamps," Physics of Plasmas 7 2186 (2000).

Ahmed El-Habachi and Karl H. Schoenbach, "Generation of Intense Excimer Radiation from High-Pressure Hollow Cathode Discharges," Appl. Phys. Lett. 73 885 (1998).

Mohamed Moselhy, Wenhui Shi, Robert H. Stark, and Karl H. Schoenbach, "Xenon Excimer Emisions from Pulsed Microhollow Cathod Discharges," Appl. Phys. Lett. 79, 1240 (2001).

W. Shi, R. H. Stark, and K. H. Schoenbach, "Parallel Operation of Microhollow Cathods Discharges," IEEE Trans. Plasma Science 27 16 (1999).

K. H. Schoenbach, C. A. Verhappen, T. Tessnow, F.E. Peterkin, and W. W. Byszewski, "Microhollow Cathode Discharges," Appl. Phys. Lett., 68 13 (1996).

J. W. Frame and J. G. Eden, "Planar Microdischarge Arrays", Electronics Letts., 34, 1529 (1998).

Robert H. Stark, Ahmed El-Habachi and Karl H. Schoenbach, "Parallel Operation of Microhollow Cathod Discharges," Conf, Record, IEEE Intern. Conf. Plasma Science, New Orleans, 2000, paper 1P24, p. 111.

Mohamed Moselhy, Wenhui Shi, Robert H. Start, and Karl H. Schoenbach, A Flat Glow Discharge Excimer Radiation Source, IEEE Trans. Plasma Science, 30, 198 (2002).

_US 7,439,663 B2_

MICRO-DISCHARGE DEVICES AND APPLICATIONS

RELATED APPLICATIONS

This application claims priority to U.S. Provisional Application No. 60/438,270, filed on Jan. 2, 2003, which is incorporated by reference in its entirety.

BACKGROUND OF THE INVENTION

1. Field of the Invention

This invention relates generally to gas discharge light sources and the applications of those devices, including for the production of ultra-pure water such as used in semiconductor processing. This invention also relates to an excimer gas discharge light source for producing high intensity UV and Vacuum UV light.

2. Description of the Related Art

Volatile organic compounds and other organic chemicals are widely used as solvents, degreasers, coolants, gasoline additives, and raw materials for other synthetic organic chemicals. These organic compounds are commonly found as trace contaminants in municipal and natural water streams. As a group, they are referred to as total oxidizable carbons (TOC). These compounds are very difficult to remove by conventional means, such as filtration and absorption by media such as activated carbon.

A number of methods have been developed to remove TOC from water for applications requiring ultra-pure water. These methods physically separate the TOC from the water, chemically bind them so they are removed from the water, or chemically break them down into harmless components.

Physical separation is usually performed through a distillation process. This is an effective process, but is expensive and has limitations on throughput. It also creates a disposal problem, because the TOC are not destroyed in the process.

Chemical binding is normally performed by introducing activated carbon into the water, which leads to a chemical reaction that removes the TOC. Chemical breakdown of the TOC can be performed by catalysts, for example. The effectiveness of catalytic reactions is very dependent on the contaminant. TOC usually are not completely broken down by catalysts, and the introduction of the catalyst may lead to other problems in ultra-pure water systems.

Exposure to ultraviolet light is another means of removing TOC from water in ultra-pure water systems. The ultraviolet light for TOC removal in current commercially available systems is produced by low-pressure mercury vapor lamps operating at the 185 nm wavelength. There also exist systems using pulsed light sources that produce broad spectrum light below 250 nm. These pulsed light sources are typically xenon flashlamps. Excited dimer ("excimer") pulsed discharge lamps have also been employed for removing TOC.

There are problems with the use of each of these lamps. For pulsed flashlamps, the conversion efficiency of input energy to light is less than 50%, only a small fraction of which is useful for removing TOC. For conventional excimer lamps, this figure is much lower, typically less than 5%. Direct discharge excimer lamps are limited to pulse lengths of about 100 ns, with a 10's of µs recovery time between pulses. This severely limits the energy throughput of the system and requires complicated electronics to achieve optimal performance. Pulsed flashlamps suffer from the same difficulty, albeit on longer time scales. This results in further degradation of process efficiency, and an even higher process cost. Pulsed flashlamps produce broadband radiation that would seem to overcome this limitation, but the blackbody nature of the spectrum generated by pulsed flashlamps still leads to generation of a large amount of the light at unproductive wavelengths. The result of all these inefficiencies is a process that is very expensive both in initial and operating cost. These technologies are not commonly used for that reason.

Conventional ultraviolet (UV) systems for TOC reduction normally use low or medium pressure mercury vapor lamps. These lamps are similar to common fluorescent lamps, but use higher quality components and a different operating point to radiate UV light with the proper spectrum for destroying TOC's. These lamps convert electrical energy into TOC-destroying ultraviolet light with 2.5% to 5% efficiency. A major drawback of these systems is the presence of mercury, which is a contamination concern in the event of lamp breakage.

The low conversion efficiency in producing the desired 185 nm light and the narrow bandwidth of that light in mercury vapor lamps leads to systems which are physically large and which require a large number of lamps to achieve the desired level of TOC removal in ultra-pure water systems. This leads to high initial and operating costs due to floor space and lamp replacement requirements.

SUMMARY OF THE INVENTION

The system, method, and devices of the present invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of the Invention" one will understand how the features of this invention provide advantages which include more cost effective ultra-pure water treatment.

One embodiment of the present invention is a system for treating a fluid. The system comprises at least one micro-discharge excimer gas discharge light source which is configured to expose a fluid passing through a treatment chamber to radiation. The treatment chamber is coupled to a fluid inlet and a fluid outlet for passing the fluid through the treatment chamber. Each light source may comprise a cathode, dielectric, anode, and a discharge gas. Preferably, the cathode has a portion of its surface covered with a dielectric so as to define at least one uncovered region of the cathode. At least a longest dimension of the cathode region is substantially greater than the dielectric thickness. The anode is spaced from the cathode by at least the thickness of the dielectric. The gas discharge medium is in contact with anode and the cathode. One or more microhollows may penetrate into the uncovered portion of the cathode.

Another embodiment of the invention is a method for purifying fluids of contaminants. The method comprises producing light using a micro-discharge excimer gas discharge light source. The light source may produce wavelengths in the range of 100 nm-400 nm. A fluid is exposed to the light produced by the light source. Each light source comprises a cathode, dielectric, anode, and a discharge gas. The cathode has a portion of its surface covered with a dielectric so as to define at least one uncovered region of the cathode. At least a longest dimension of the cathode region is substantially greater than the dielectric thickness. The anode is spaced from the cathode by at least the thickness of the dielectric. The gas discharge medium is in contact with the anode and the cathode. One or more microhollows may penetrate into the uncovered portion of the cathode.

Another embodiment of the present invention is a light source comprising a cathode, dielectric, anode, and a discharge gas. The cathode may have a portion of its surface covered with a dielectric so as to define at least one uncovered region of the cathode. At least a longest dimension of the cathode region may be substantially greater than the dielectric thickness. The anode is spaced from the cathode by at least the thickness of the dielectric. The gas discharge medium is in contact with anode and the cathode. One or more microhollows may penetrate into the uncovered portion of the cathode.

Another embodiment of a light source may comprise a first and second electrode. The first electrode may have a portion of its surface covered with a dielectric so as to define at least one uncovered region of the first electrode. At least a longest dimension of the first electrode region is substantially greater than the dielectric thickness. The second electrode may be spaced from the first electrode by at least the dielectric thickness. Each of the first and second electrodes may be constructed of a base electrode material. A gas discharge medium is in contact with the first electrode and the second electrode. One or more microhollows may penetrate into at least one electrode. An electrode surface material in at least one of the microhollows is a different material than the base electrode material.

In one embodiment, at least one of the microhollows is surrounded by a circumferential gap penetrating a portion of at least one electrode. The gap penetrates the electrode material to a selected thickness of electrode material. The thickness is selected to form a fusible link.

DETAILED DESCRIPTION OF THE PREFERRED EMBODIMENT

The following detailed description is directed to certain specific embodiments of the invention. However, the invention can be embodied in a multitude of different ways as defined and covered by the claims. In this description, reference is made to the drawings wherein like parts are designated with like numerals throughout.

1. Fluid Treatment Apparatus

In one embodiment of the invention, a compact, efficient, micro-discharge excimer gas discharge light source is used to overcome many of the difficulties and inefficiencies in removing contaminants, such as TOC, from fluids. A micro-discharge excimer gas discharge light source can operate continuously using an excimer gas mix as the medium by which light is generated. This overcomes the low energy throughput and complicated electronics required by conventional excimer lamps. A micro-discharge excimer gas discharge lamp also has a demonstrated conversion efficiency higher than that for mercury vapor lamps and conventional excimer lamps. This conversion efficiency has been demonstrated at >10% with a theoretical maximum of over 30% in the wavelengths important for removal of TOC. This results in systems that are smaller and more energy efficient than conventional systems for the same application.

Figure 1:
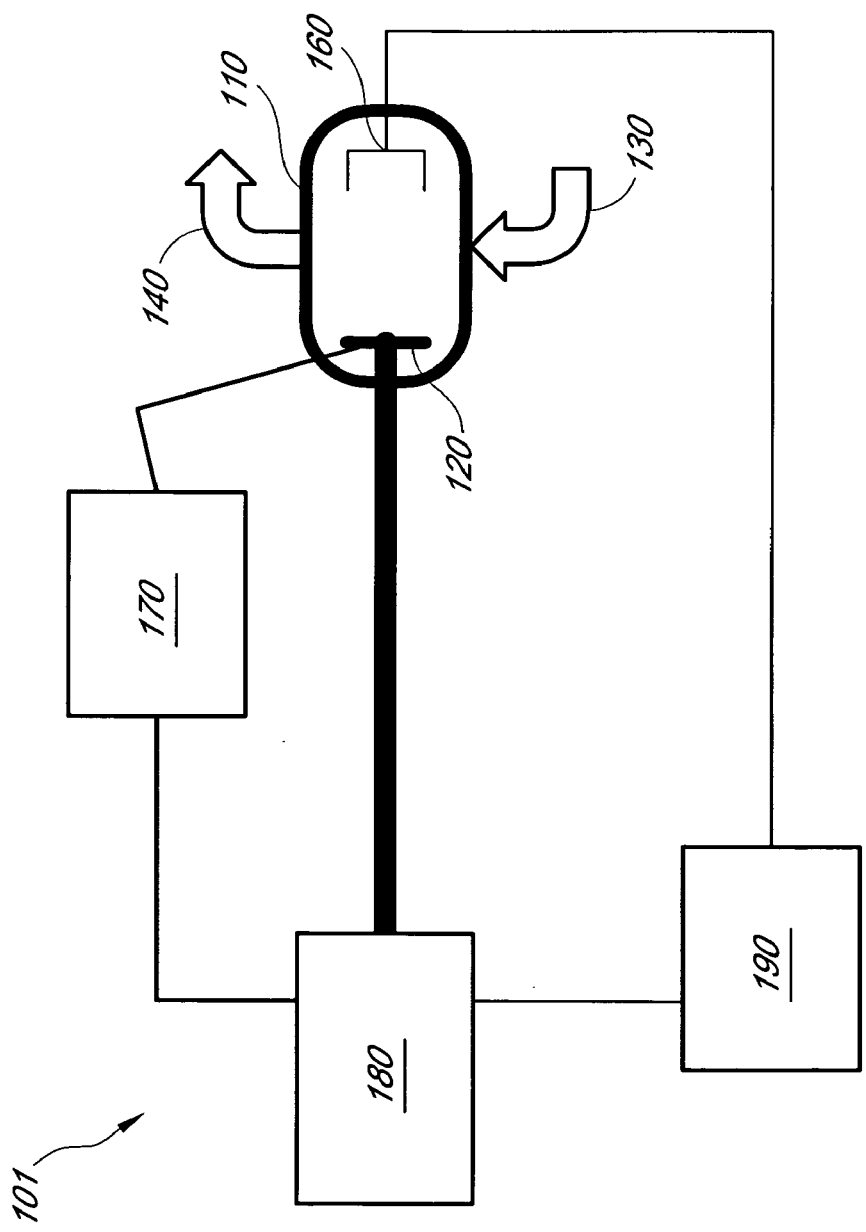
FIG. 1 depicts a system for producing ultra-pure water through UV irradiation according to an embodiment of the present invention.

FIG. 1 depicts a simplified block diagram of an embodiment of a fluid treatment system 101 according to the present invention. The basic method of operation for treating a fluid, such as water, to remove contaminants, such as TOC, is to provide the fluid to the fluid inlet 130, pass the fluid through the treatment chamber 110, then remove the fluid via the fluid outlet 140. The passing fluid is irradiated by electromagnetic energy from a light source 120, which in a preferred embodiment may be a micro-discharge excimer gas discharge light source. A source of gas 170 may be coupled to the light source 120. A power source and related electronics 180 may also be coupled to the light source 120. An UV detector 160 may be provided opposite the light source 120. The detector 160 and the power source and related electronics 180 may be coupled to controls 190. The power source, related electronics, controls, and detector in an embodiment of the system may be comprised of commercially available components. The power source may provide alternating, direct, or pulsed electrical current. In one embodiment, the light source 120 may comprise arrays of micro excimer gas discharges. In most cases, these arrays are constructed as a laminated sheet comprising generally parallel conducting or semi-conducting cathode and anode sheets separated by an insulating dielectric. The cathode, anode, or both are provided with holes or hollows in which the micro-discharges are formed. Micro-discharge light sources have not been utilized in water treatment applications prior to the present invention. In contrast to mercury lamps, use of a light source 120 according to such an embodiment allows a smaller footprint light source 120 to achieve the same light intensity, which is especially advantageous for fluid treatment applications. Further details of this implementation and specific embodiments of advantageous micro-discharge excimer light sources are set forth below.

Figure 2:
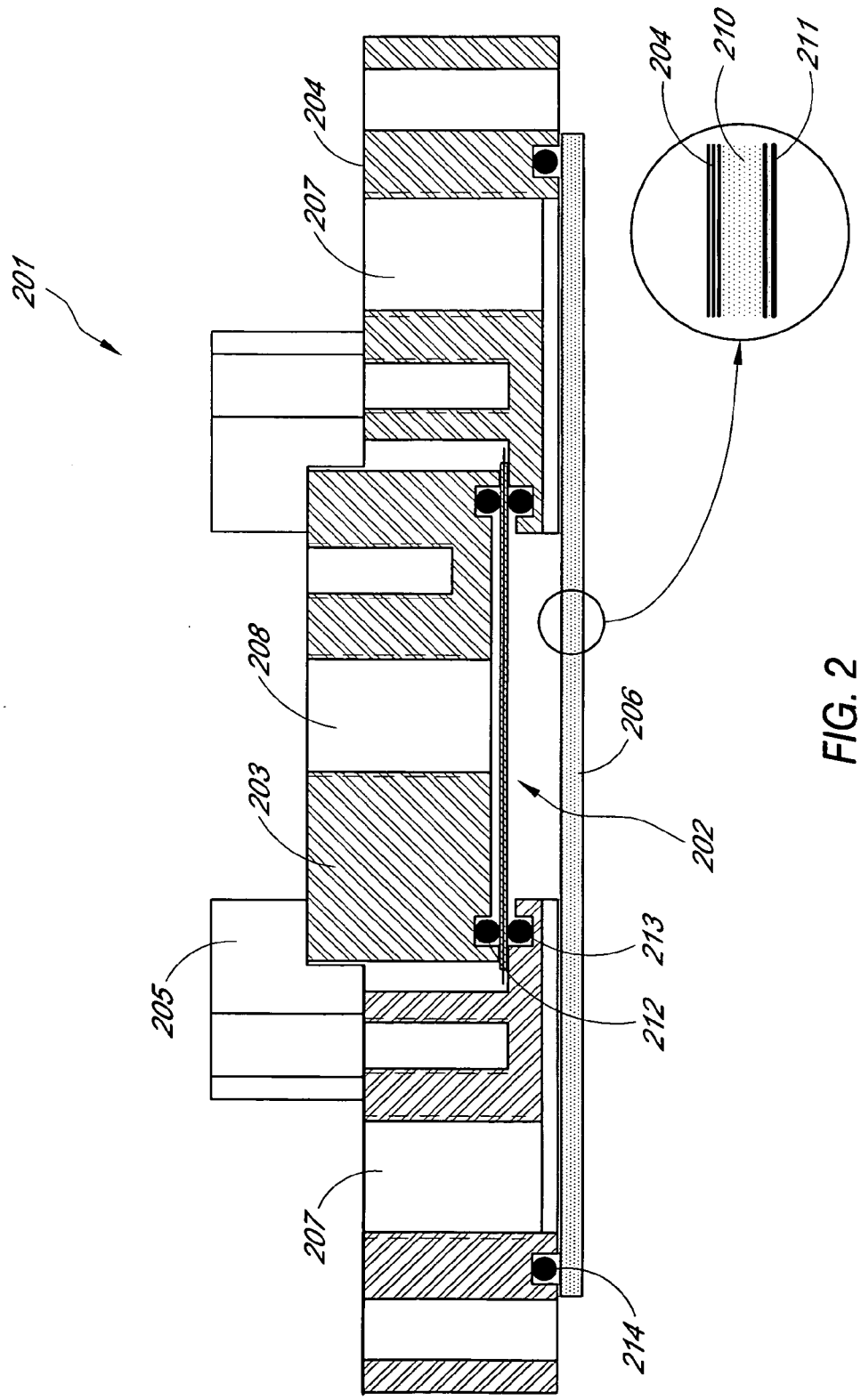
FIG. 2 depicts a cross-sectional view of a lamp and housing with gas cooling passages and a multi-layer window which may be used in an embodiment of system as depicted FIG. 1.

One embodiment of a light source 120 suitable for treatment applications is depicted in FIG. 2. The entire light source assembly 201 may be mounted in or to a fluid treatment chamber 110. In an embodiment mounted to a fluid treatment chamber, the window 206 is pressed between the fluid treatment chamber and the electrode plate 204, providing the compression force for the o-ring 214. The embodiment shown allows the gas discharge element 202 to be placed as close as possible to the fluid in the treatment chamber while maintaining the performance features of the light source.

The window 208 may be comprised of 3 layers 209, 210, and 211. Each of these layers transmits the proper wavelength light. The advantage of the layers is that suitably thin layers of material with excellent stability when exposed to the fluid, in the case of layer 211, or the discharge gas, in the case of layer 209, can be employed to extend the life of the light source. The middle layer 210 may have relatively high transmissivity in the relevant wavelength region and enough physical strength to support the pressure differences expected in normal operation. The materials in any two of these layers 209, 210, and 211 may be the same. It is also possible that all three layers 209, 210, and 211 may be the same material (either a laminate or a solid block of material) if the single material has sufficient mechanical strength, transmissivity, as well as chemical resistance to a fluid to be treated and the gas in the lamp.

In one embodiment, the fluid contacting layer 211 may be a layer of quartz a few angstrom in thickness. The gas contacting layer 209 may be a material resistant to attack by halogen gases and which can transmit UV light down to 100 nm in wavelength. Magnesium fluoride or calcium fluoride may be used for layer 209. The center layer, which provides the mechanical strength to support the pressure difference between the fluid and the gas in the plenum and can transmit UV light down to 100 nm, may also be magnesium fluoride or calcium fluoride.

In another embodiment, the light source, including the window 208, form part of a chamber seal. This simplifies the connections to the chamber and reduces the number of chamber components substantially. Further, a two-sided chamber may be formed with at least two micro-discharge excimer gas discharge light sources 201 to maximize light delivery while retaining a low profile treatment chamber.

Figure 13:
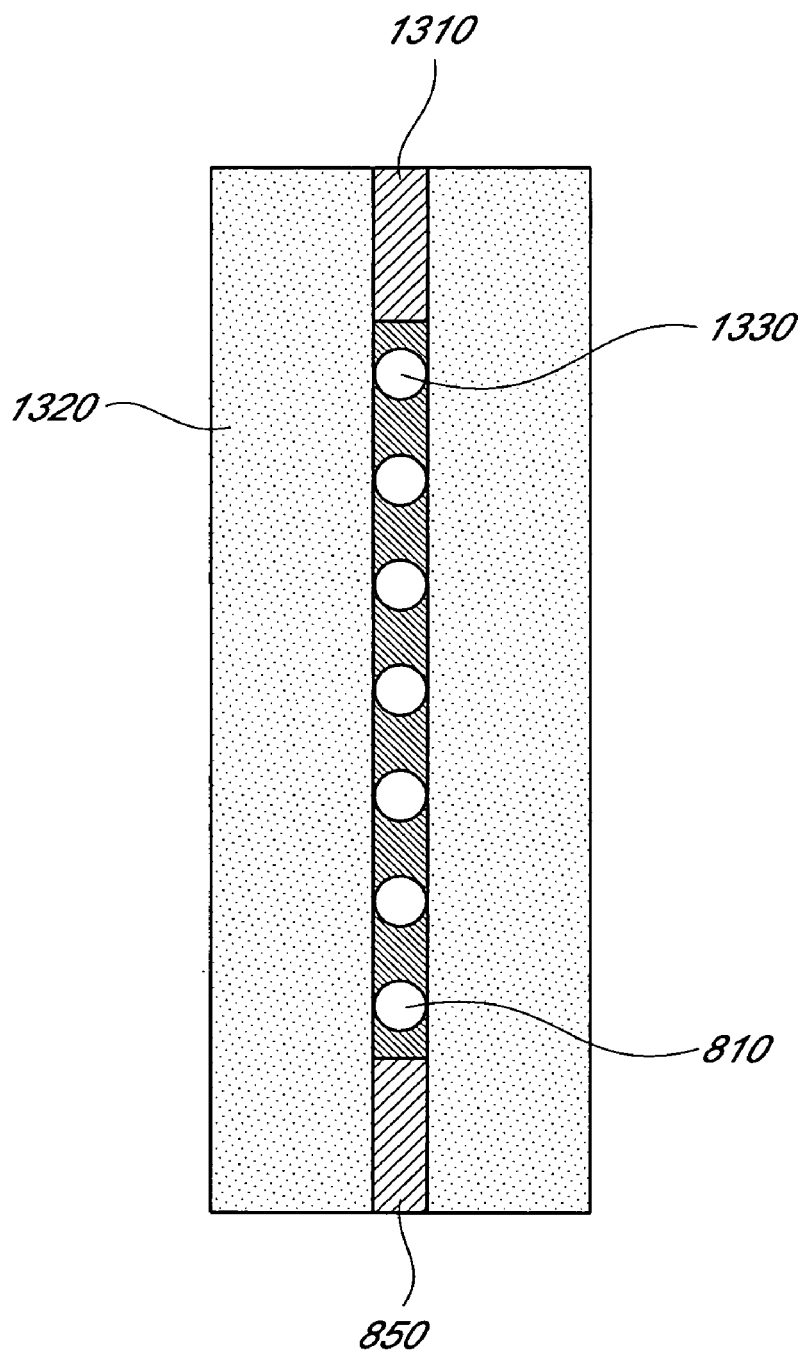
FIG. 13 is a top view of another embodiment of a light source according to the present invention.
Figure 16A:
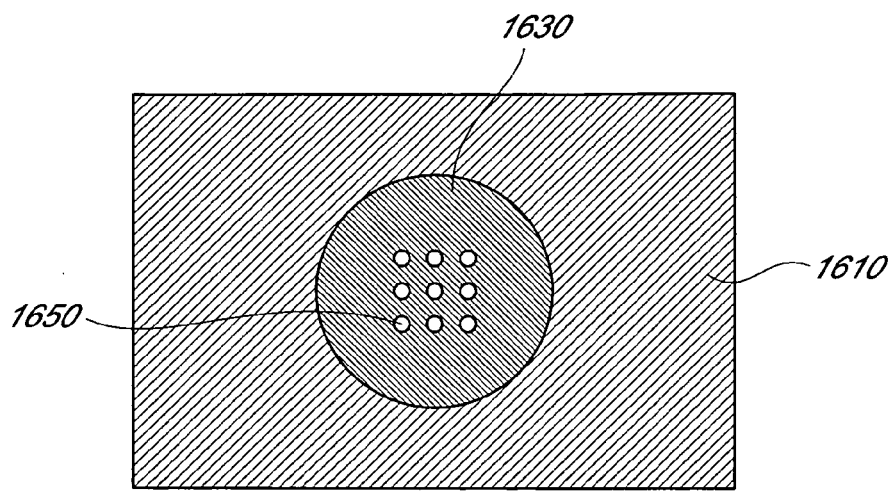
FIG. 16A depicts the top view of another embodiment of a light source according to the present invention.

An embodiment of a gas discharge element 202 may contain one or more micro-gas discharge cells. As described further below, these devices typically comprise an anode plate and a cathode plate separated by a dielectric. Many such configurations utilize micro-hollows or micro-holes formed in the anode, cathode, or both. Thus in some embodiments, each light source may be comprised of one or more micro-hollows. FIG. 2 depicts a simple micro-discharge excimer gas discharge element comprising several microhollows extending through the anode, cathode, and dielectric. Other embodiments of a gas discharge cell 202 may also comprise a plurality of light sources according to embodiments having an exposed cathode region, for example, as depicted in FIGS. 10, 13, and 16A.

In the embodiment of FIG. 2, the electrode plates 203 and 204 are constructed such that good electrical contact is made to each electrode, the anode and the cathode, of the gas discharge element at points delineated by the perimeter of electrode plate 203. The compression ring 205 ensures that this contact is made while ensuring that the compression force is low enough to preclude damage to the gas discharge element. O-ring 212 seals the upper gas-tight passage between the electrode plate 203 and the gas discharge element 202. This gas-tight passage receives gas through gas port 208. O-ring 213 seals off the upper portion of the lower gas-tight passage and o-ring 214 seals the lower portion of this gas-tight passage at the window 206. The lower gas-tight passage exhausts gas through gas ports 207.

By coupling the input gas port 208 and exhaust gas port 207 to a source of cooling gas, the gas discharge element 202 may be cooled by the flow of cooled gas along the gas-tight passages. Further, removing the contamination resulting from the electrode erosion from the cell may also extend its life. Flowing gas through the microhollows of a cell, or across the surface of the cathode or anode of a cell is one embodiment of a means to clear this contamination from the vicinity of the cell. The contaminants can then be deposited in a less critical area within the lamp or removed from the system through replenishment of the gas.

Figure 3:
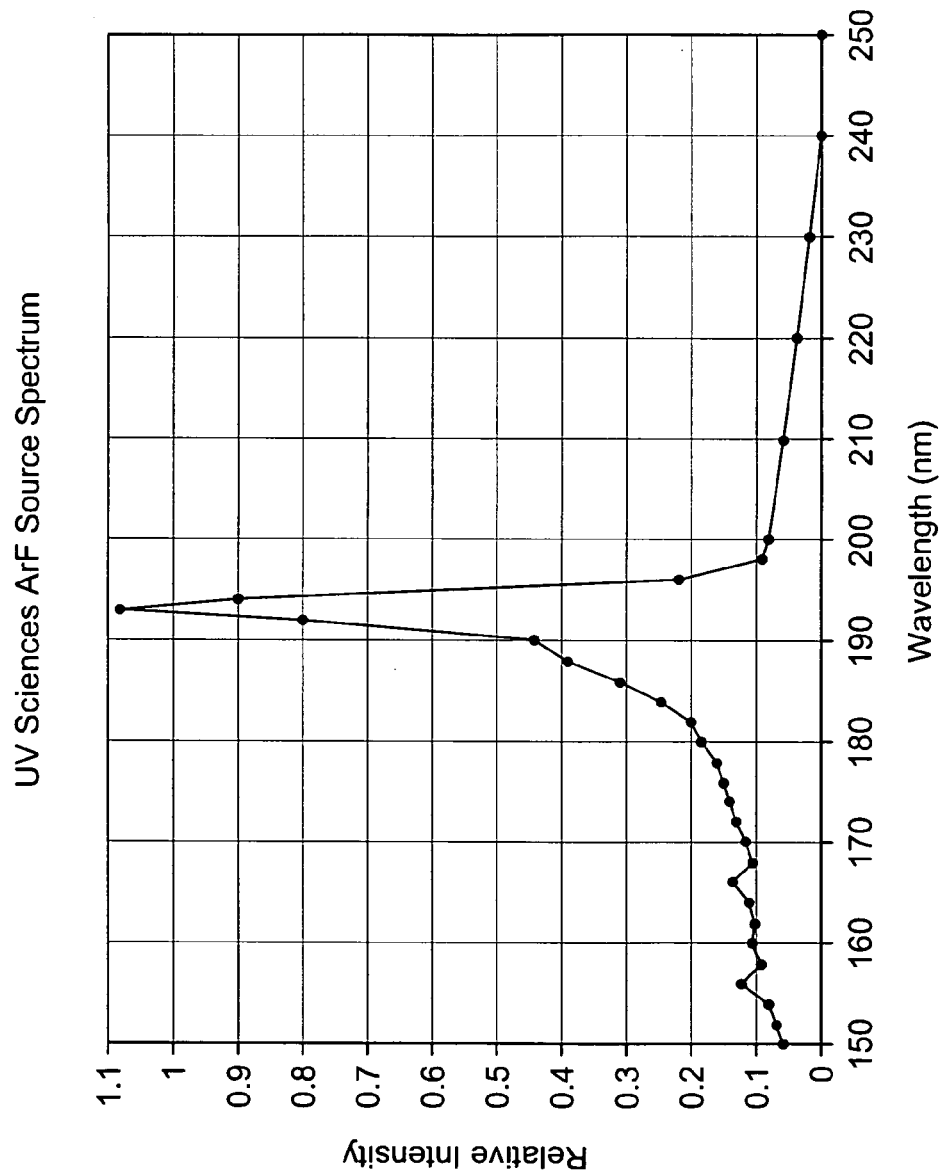
FIG. 3 is a graph of wavelength versus intensity for a light source, used in one embodiment of system as depicted FIG. 1, where the discharge medium is argon fluoride.

Using performance data for a micro-discharge excimer gas discharge light source 120, the TOC reduction performance of a 1 W/cm$^2$ argon fluoride (ArF) source (peak output at 193 nm) on the chemical dichloroethene (CH$_2$Cl$_2$) has been modeled for comparison with existing systems. The ArF source spectrum is shown in FIG. 3

Figure 4:
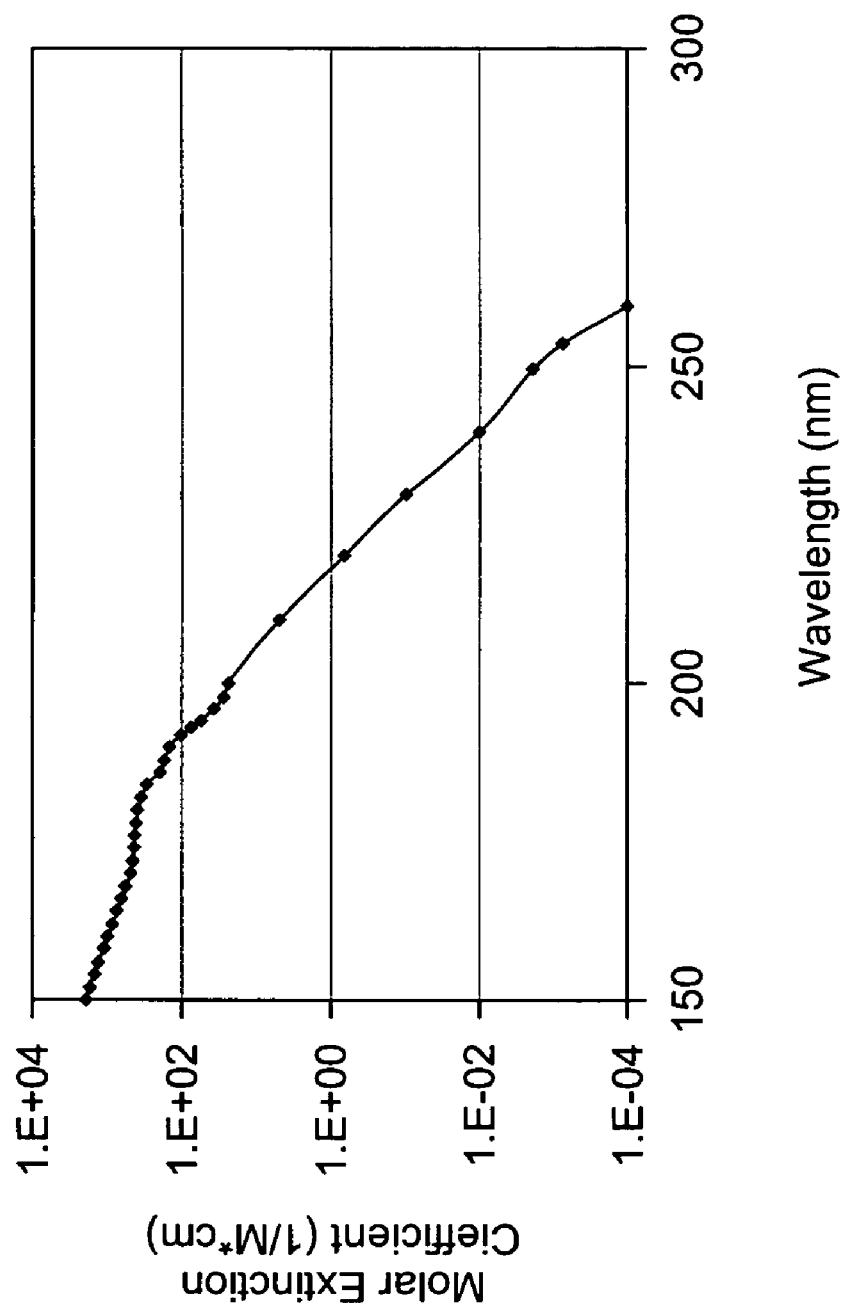
FIG. 4 is a graph of the molar extinction coefficient for dichloroethene versus wavelength of an irradiating light source for a system as depicted in FIG. 1.

Assuming low total absorbance of light by the TOC being removed, a good assumption for a trace contaminant in high purity water, the rate of chemical destruction can be calculated as $$dC/dt = -2.3 I_0 \Phi \epsilon L\ C,$$

where C is the initial concentration, $I_0$ is the source intensity, $\epsilon$ is the molar extinction coefficient for the TOC being eliminated, L is the path length, and $\Phi$ is the apparent disappearance quantum yield. Given the molar extinction coefficient, shown in FIG. 4, a light source 120 according to an embodiment of the present invention interacts strongly below the source peak at 193 nm due to the significant increase in molar extinction coefficient at shorter wavelengths (note the log scale in FIG. 4). This is true even though only about 40% the light source initial intensity is transmitted through the water (water is a strong absorber of light wavelengths less than 200 nm). Many other common chemical contaminants have molar extinction coefficient curve with a shape very similar to dichloroethene.

Using a path length L of 1 cm, $\Phi$=1 (conservative, measured can be as high as 6-7), and an initial contamination concentration of 1 ppm, a dichloroethene destruction rate of 95 ppm per second may be estimated. This is approximately 27 times higher than the destruction rate for a low pressure mercury lamp, emitting at 185 and 254 nm, with the same nominal output power of 1 W/cm$^2$ (typical for an array of low pressure Hg lamps). In addition, a light source according to the present invention may be 3-4 times more efficient in producing the light for a given wall plug power. This results in 75-100 times more TOC removal per watt of input power for a light source 120. Further, a micro-discharge light source 120 has the capability to operate at higher than 1 W/cm$^2$, which would provide even better performance than that described above.

The lower manufacturing cost of a fluid treatment system 101 will allow it to have less expensive construction than that of conventional LP Hg systems assuming the same input power while requiring less floor space. Electricity costs will be substantially less than a conventional low pressure Hg system, as detailed above. If a micro-discharge excimer gas discharge light source has a component life only half that of low pressure Hg sources, a conservative estimate would be that the system can produce a TOC level 10 times lower than the existing TOC reduction systems at the same cost.

2. Light Sources a. Background

As discussed above, a compact, efficient, micro-discharge excimer gas discharge light source may be used to overcome some of the difficulties and inefficiencies in the prior art in removing contaminants, such as TOC, from fluids. Gas discharge lamps produce light by generating plasmas which radiate in the Ultraviolet and Vacuum Ultraviolet (Vacuum UV is a portion of the UV spectrum from about 100 to 300 nm which is strongly absorbed by oxygen) regions of the electromagnetic spectrum. The most common of these lamps are mercury lamps, which emit line radiation at 254 nm and 185 nm. While having an efficiency as high as 70% at 254 nm, mercury lamps have relatively low intensity, ranging from 40 µW/cm$^2$ to 20 mW/cm$^2$ at 254 nm. The efficiency and intensity at 185 nm is much lower than that at 254 nm. High-pressure xenon discharge sources, which emit over a spectral range extending from UV (below 300 nm) to the infrared, are much more powerful but have a lower efficiency of less than 1%.

Excimer lamps are quasi-monochromatic light sources, which can be operated over a wide range of wavelengths in the ultraviolet and vacuum-ultraviolet portions of the spectrum. The operation of excimer lamps is based on the formation of excited molecular complexes (excimers). Excimers are molecules, e.g. of rare gases, which exist only in an excited state. Examples of such complexes are rare gas dimers and rare gas/halogen exiplexes. Excimers rapidly decay, emitting radiation in the transition from the bound excimer state to a ground state. The advantage of excimer lamps over other spectral lamps is their high internal efficiency, which may reach values of up to 40% when operated at high pressure. See B. Gellert and U. Kogelschatz, "Generation of Excimer Emission in Dielectric Barrier Discharges," Appl. Phys. B 52, 14 (1991), herein incorporated by reference in its entirety. For xenon excimers, the emission wavelength is around 172 nm.

Because excimer lamps are a noncoherent radiation source, they may be scaled to larger sizes and to used to irradiate, and used, for example, to treat, relatively larger areas at once. Applications for excimer lamps include UV curing and polymerization, UV oxidation, photo-chemistry, photo-deposition, photo-annealing, and pollution control.

Two conditions must be satisfied in order to generate excimer radiation. First, the electron energy distribution must contain a sufficient concentration of electrons with energies larger than the excitation energy of the excimer gas atoms. Second, since the formation of excimers is a three-body process, the pressure needs to be high, on the order of one atmosphere or higher. These two conditions can only be satisfied simultaneously in nonequilibrium plasmas. There are two ways to generate nonequilibrium plasmas. Operation at high electric fields on such a short time scale that thermalization of the plasma is prevented, or operation on a small enough spatial scale, e.g. in the cathode fall of a gas discharge. The first concept is used in barrier (silent) discharges, discharges between dielectric covered electrodes separated by gas filled gaps of millimeter to centimeter distance. See U. Kogelschatz, "Silent discharges for the generation of ultraviolet and vacuum ultraviolet excimer radiation," Pure & Appl. Chem. 62, 1667 (1990), herein incorporated by reference in its entirety.

The second kind of nonequilibrium plasmas is found in plasma boundary layers, particularly the cathode fall region of stable high pressure discharges. The cathode fall region is defined as a region of increased electric field near the cathode surface and for gas discharges is characterized by an electron energy distribution with a high concentration of high-energy electrons. See P. Gill and C. E. Webb, "Electron Energy Distribution in the Negative Glow and their Relevance to Hollow Cathode Lasers," J. Phys. D: Appl. Phys. 10, 299 (1977), herein incorporated by reference in its entirety. The main problem with generating an extended area cathode fall are instabilities which lead to glow-to-arc transitions. See E. E. Kunhardt, "Generation of Large-Volume, Atmospheric-Pressure, Nonequilibrium Plasmas," IEEE Trans. Plasma Science 28, 189 (2000), herein incorporated by reference in its entirety. The formation of an arc, a localized area of high current density, leads to a thermal plasma with low average electron energies, and consequently low excimer emission.

However, by using a hollow cathode geometry, it is possible to generate stable high pressure gas discharges even in electronegative gases, such as those containing Cl, Br, and F, and $O_2$. See G. Schaefer and K. H. Schoenbach, "Basic Mechanisms Contributing to the Hollow Cathode Effect" in *Physics and Applications of Pseudosparks*, 55 (M. Gundersen and G. Schaefer, eds., Plenum Press, 1990), and Karl H. Schoenbach, et al, "Microhollow Cathode Discharge Excimer Lamps," Physics of Plasmas 7, 2186 (2000), each herein incorporated by reference in its entirety. These discharges, operating in noble gases or mixtures of noble gases and halogens or halogen compounds, have been proven to be very efficient sources of excimer radiation. For dc discharges, efficiencies of 6% to 9%, for pulsed discharges, efficiencies of up to 20% have been measured. See Ahmed El-Habachi and Karl H. Schoenbach, "Generation of Intense Excimer Radiation from High-Pressure Hollow Cathode Discharges," Appl. Phys. Lett. 73, 885 (1998) and Mohamed Moselhy, et al, "Xenon Excimer Emission from Pulsed Microhollow Cathode Discharges," Appl. Phys. Lett. 79, 1240 (2001), each herein incorporated by reference in its entirety.

Industrial applications of microhollow cathode discharge excimer lamps require generally higher total optical power levels than achievable with single microhollow cathode discharges. The optical power of single xenon discharge approaches values on the order of a hundred mW (at an efficiency of 6% to 9%). Consequently, the operation at the kW optical power level would require an array of more than $10^4$ discharges. The fabrication of lamps with multiple microhollow cathode discharges (arrays of discharges) has been studied and results have been reported in the scientific literature. See W. Shi, R. H. Stark, and K. H. Schoenbach, "Parallel Operation of Microhollow Cathode Discharges," IEEE Trans. Plasma Science 27, 16 (1999), K. H. Schoenbach, C. A. Verhappen, T. Tessnow, F. E. Peterkin, and W. W. Byszewski, "Microhollow Cathode Discharges," Appl. Phys. Lett., 68, 13 (1996), and J. W. Frame and J. G. Eden, "Planar Microdischarge Arrays," Electronics Letts., 34, 1529 (1998), each herein incorporated by reference in its entirety.

For stable operation of gas discharge lamps, individual ballasting is an approach for relatively small arrays. The use of distributed resistive ballast may be used for larger arrays. See W. Shi, R. H. Stark, and K. H. Schoenbach, "Parallel Operation of Microhollow Cathode Discharges," IEEE Trans. Plasma Science 27, 16 (1999). This may be achieved by using a semi-insulating material, such as semi-insulating silicon, as anode material. Distributed resistive ballasts allow the generation of arrays of microhollow cathode discharge excimer sources of any size, limited only by the thermal loading of the ballast resistor. This method of generating arrays of discharges also requires the use of semi-insulating material as cathode. The dissipation of energy in this layer in form of Joule heat can be substantial, and consequently reduces the efficiency of the lamp. Further, UV light intensity is also limited by these thermal constraints. Thus, other means of stable operation of microhollow cathode discharge light sources is desirable.

Figure 5:
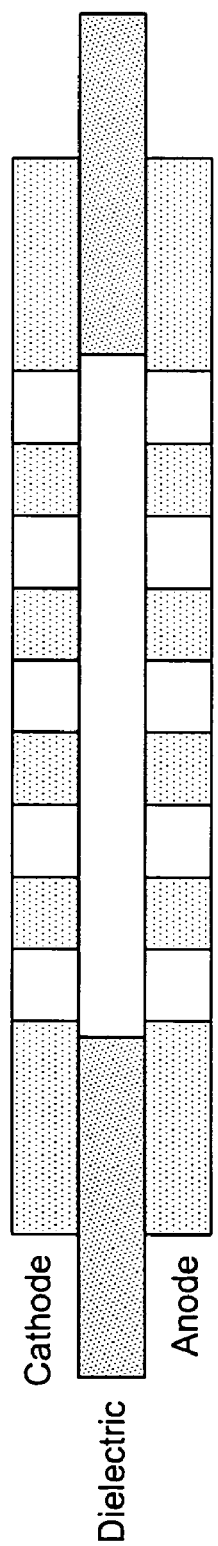
FIG. 5 depicts a microhollow electrode configuration with recessed dielectric.
Figure 6:
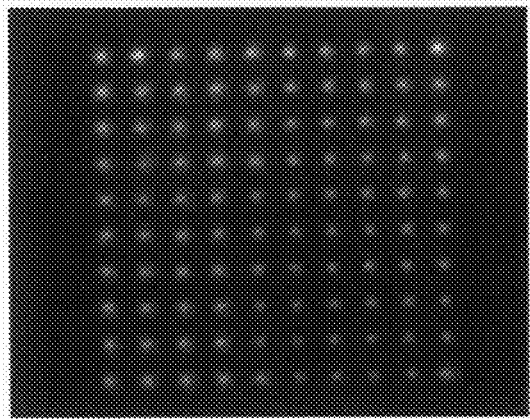
FIG. 6 is an end-on photograph of micro-discharges in the visible light spectrum for a structure with 10×10 microhollows.

Stable operation of microhollow cathode discharges may also be achieved without ballasting the individual discharges when operating in regions where the V-I characteristic of the microhollow cathode discharge has a positive slope: the Townsend region and the abnormal glow region. See Karl H. Schoenbach, et al, "Microhollow Cathode Discharge Excimer Lamps," Physics of Plasmas 7, 2186 (2000), herein incorporated by reference in its entirety. This mode of operation reduces the thermal stress on the electrodes considerably. FIG. 5 depicts the cross-section of an electrode geometry which may be utilized for a discharge array operating in the Townsend region. Typical dimensions of electrode layers, dielectric spacer, and microhollows may be anywhere from about 10 to several hundred micrometers. Currents per microhollow are typically on the order and less than 100 microamperes. A gas medium, not pictured, is maintained surrounding, and in contact with the electrodes. FIG. 6 is an end-on visible light photograph of operation a device in this mode using Argon at 127 Torr as the gas medium. The total current in the operating device as shown is 12 mA with an average current of 120 µA thus flowing through each microhollow.

Figure 7A:
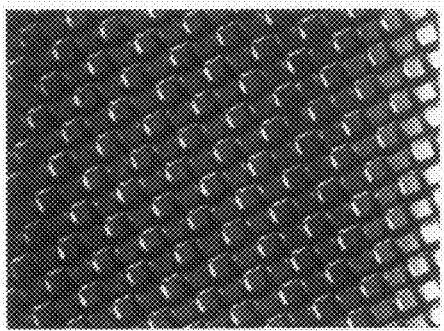
FIG. 7A is a top-view photograph of a cathode comprised of a stainless steel mesh.
Figure 7B:
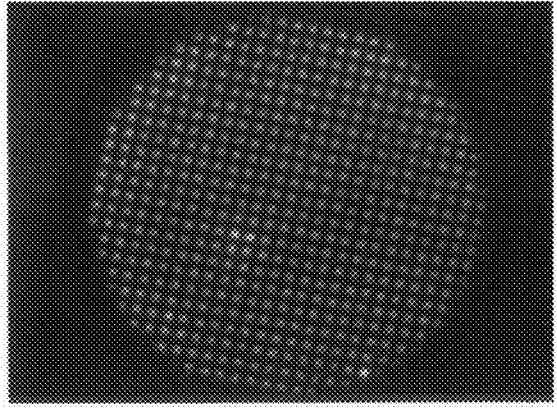
FIG. 7B is a top-view photograph of a device using the cathode in FIG. 7A in operation.

A second embodiment of a light source utilizing Townsend region operation is shown in the photograph of FIG. 7A. In this embodiment, a metal mesh is used to generate a large number of micro cathode openings. The mesh in the depicted embodiment produced square openings of approximately 300 µm. FIG. 7B is a photograph of this device in operation using an Argon gas medium at 80 Torr. Embodiments using a mesh may be constructed such that a mesh replaces the cathode, or the cathode and anode. Embodiments may be constructed such that the anode is simply a metal plane. The device is depicted in FIG. 7B operating with 8 mA of total current. This total current corresponds to an average current on the order of 20 µA per microhollow.

A second mode of operation that also results in resistive behavior of gas discharges is operation in the abnormal glow mode. To operate within the abnormal glow discharge mode, a device is constructed so that the area of the cathode is limited such that for a given current, the entire cathode is within the discharge. In a normal glow discharge, for low currents, the voltage does not increase with increasing current. At a given onset current, the voltage begins to rise with current. This current increasing phase corresponds to the onset and sustained operation of an abnormal glow discharge. The resulting resistive behavior allows a plurality of microhollows to operate as micro-discharges in parallel without having to ballast each one of them. See Robert H. Stark, Ahmed El-Habachi, and Karl H. Schoenbach, "Parallel Operation of Microhollow Cathode Discharges," Conf. Record, IEEE Intern. Conf. Plasma Science, New Orleans, paper 1P24, p. 111 (2000), herein incorporated by reference in its entirety. For treatment applications, however, light sources producing light over a greater surface area of a light source are desired.

Figure 8A:
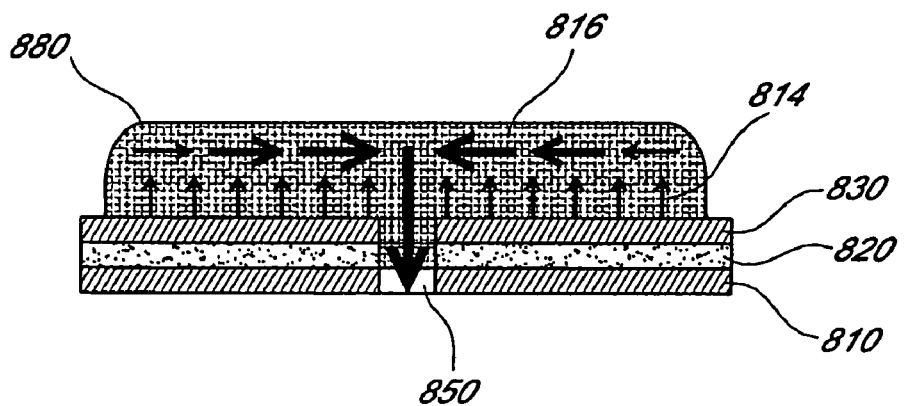
FIG. 8A depicts a simple microhollow discharge along with vectors representing the surrounding current and current density.

Surprisingly, microhollow cathode discharges at high-pressure support a stable discharge area far exceeding that of the discharge microhollow. For a light source with a single discharge having an open cathode microhollow of $10^{-2}$ mm$^2$, as shown in FIG. 8A, the discharge area extends over several square millimeters beyond the microhollow 850. The light source has a cathode 830, anode 810, and dielectric 820 layers, each of which may have a thickness on the order of 100 µm. The extended plasma layer 880, which may have a thickness of approximately 150 µm, may consist of the cathode fall and the negative glow of a high pressure glow discharge. The arrows 814, which are perpendicular to the cathode 830 surface, indicate the current in the cathode fall. The arrows 816, which are parallel to the cathode 830 surface, indicate the current density in the negative glow, which increases with greater proximity to the microhollow 850. The negative glow also serves to conduct the current radially to the cathode hollow 850, and through the cathode 830 hollow to the anode 810. The intensity of the resulting radiation is not concentrated at the hollow, but extends, more or less, homogeneously, over the entire plasma covered cathode surface. See Mohamed Moselhy, Wenhui Shi, Robert H. Stark, and Karl H. Schoenbach, "A Glow Discharge Flat Panel Excimer Radiation Source," IEEE Trans. Plasma Science 30, 198 (2002), herein incorporated by reference in its entirety. The diameter of the radiation-producing region increases with current, while maintaining a constant intensity. This allows the size of the plasma source to be controlled through varying the current, at constant voltage. For a simple single-hollow lamp as illustrated in FIG. 8A with dc operation, the current is limited to values on the order of 10 mA due to thermal loading of the electrode system. With pulsed operation of a single microhollow cathode discharge, it is possible to reach current values on the order of 100 mA, before being limited by the onset of instabilities.

Figure 9:
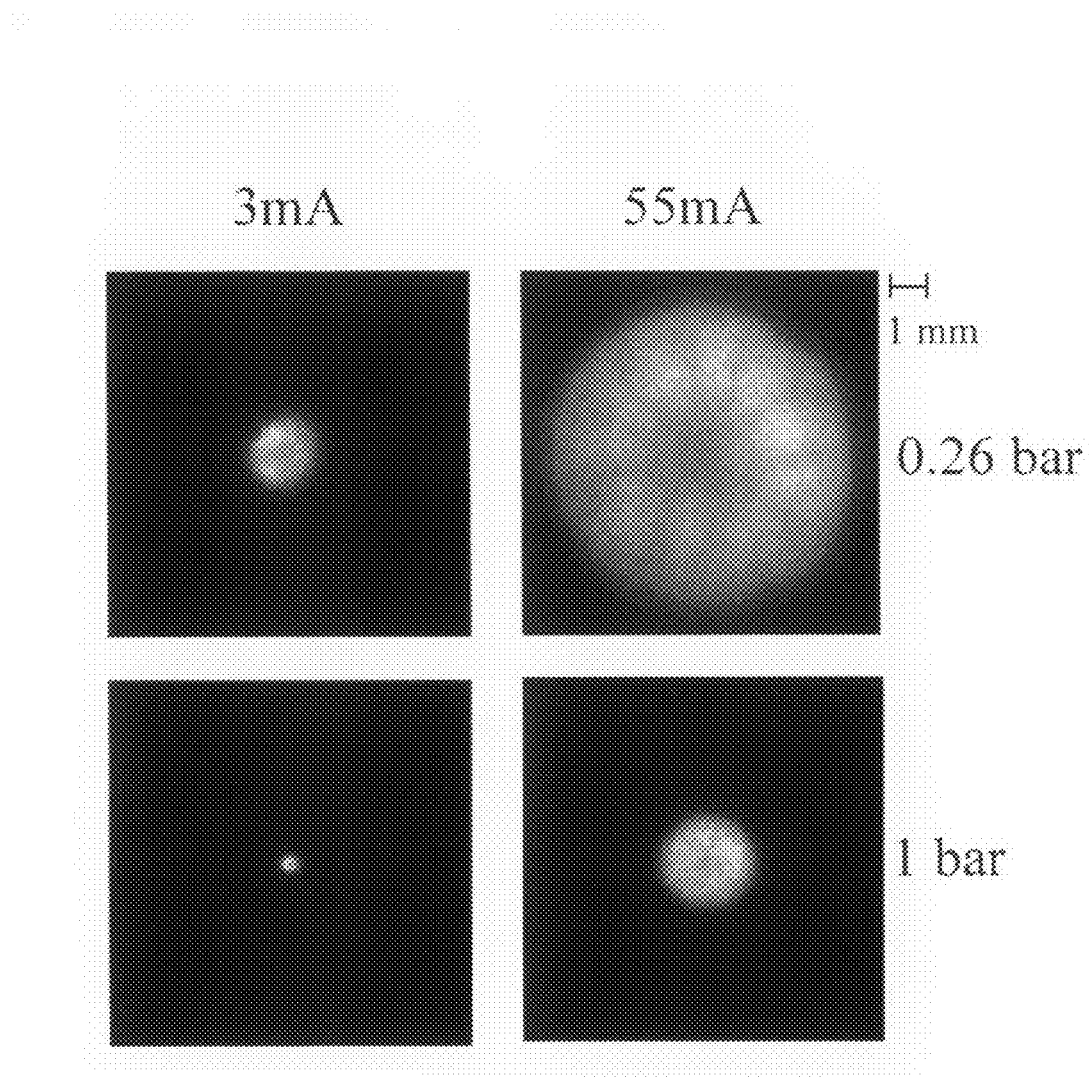
FIG. 9 is a set of end-on photographs of a single microhollow light source in operation in a xenon gas medium.

Visible light produced by operation of this simple device with a xenon gas medium is depicted in the photographs shown in FIG. 9. The results for dc operation at 3 mA, 510 and 520, are shown at a pressure of 0.26 bar and 1 bar, respectively. A larger radiating area using pulsed operation to operate at 55 mA without overheating is shown at 0.26 bar 530 and at 1 bar 540. As indicated by the 1 mm scale 550, the radiating area extends radially well beyond the approximately 100 μm opening of the microhollow.

b. Novel Micro-Discharge Excimer Light Source Configurations

The extended glow region in the area surrounding a microhollow may be exploited to construct novel micro-discharge excimer gas discharge light sources. The larger emission area attributable to each micro-discharge, allowing fewer light sources and thus a smaller total light source footprint, is especially advantageous for a light source 120 which may be used in fluid treatment applications.

Where the light source comprises a plurality of microhollows, above a critical current, the cathode fall areas merge and form a homogeneous cathode fall layer, which is also the UV emitting layer. The critical current depends on the microhollow density (the ratio of number of microhollows per open cathode area, for a homogeneous distribution of microhollows). Merging of the cathode layers coincides with the transition into an abnormal discharge, and consequently is related to the resistive current-voltage characteristic (increasing voltage with increasing current) of a device.

Figure 8B:
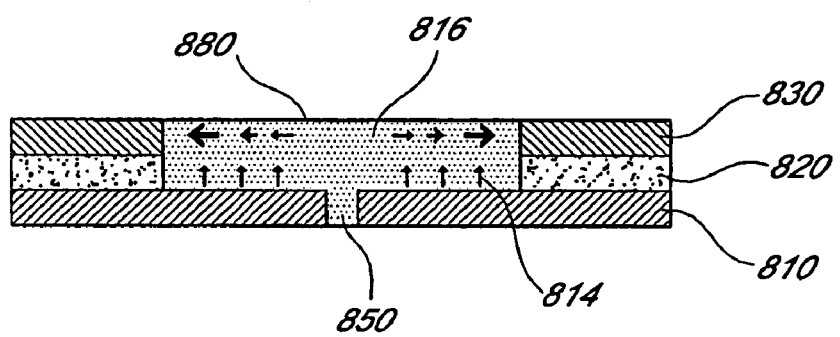
FIG. 8B depicts a simple microhollow discharge similar to that in FIG. 8A but with the discharge plasma forming above an uncovered region of cathode.
Figure 8C:
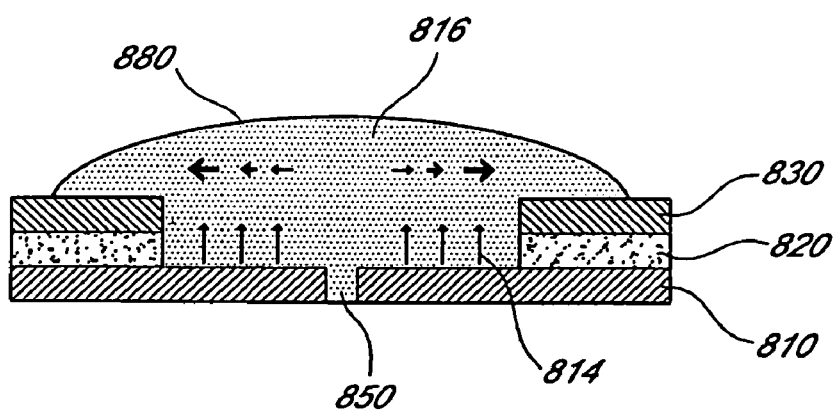
FIG. 8C depicts a simple microhollow discharge similar to that in FIG. 8B but with the discharge plasma extending beyond the boundaries of the uncovered region of the cathode.

As depicted in FIG. 8B, a simple light source 120 may be advantageously constructed with a region of a cathode 830 having only a portion of its surface covered by a dielectric 820. An anode layer 810 is spaced away from the cathode by the thickness of the dielectric 820. The portion of the cathode 830 surface covered with the dielectric 820 forms an uncovered region of the cathode which has a longest dimension that is substantially greater than the dielectric thickness. A microhollow 850 may penetrate into or through the cathode 830 in the uncovered region. When a critical current flows between the cathode 830 and the anode 810, an extended plasma layer 880 may then form in the uncovered region of the cathode 830, rather than above the cathode 830 as in the device depicted in FIG. 8A. The arrows 814, which are perpendicular to the cathode 830 surface, again indicate the current in the cathode fall. The arrows 816, which are parallel to the cathode 830 surface, indicate the current density in the negative glow, which, here, increases with greater proximity to the anode 810. As shown in FIG. 8C, the discharge can extend beyond the boundaries of the uncovered cathode region as well. This leads to a stable large area discharge like the one depicted in FIG. 9.

Figure 10A:
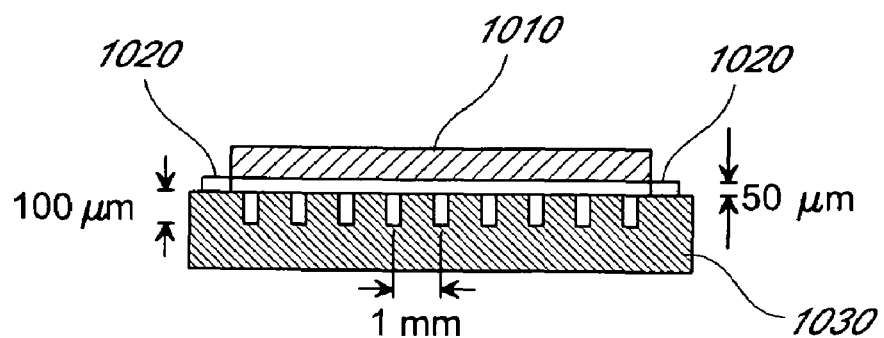
FIG. 10A depicts a cross section view of a light source according to one embodiment of the present invention.
Figure 10B:
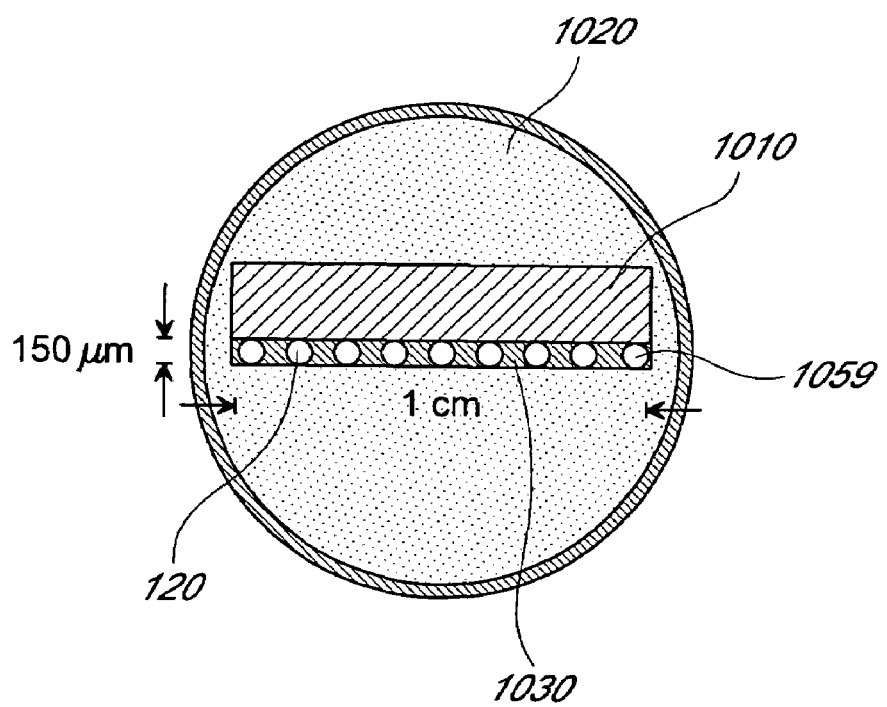
FIG. 10B depicts a top view of the same light source embodiment depicted in FIG. 10A.

This larger discharge area may thus be exploited to enable construction of light sources with much larger emission areas. FIG. 10A and FIG. 10B depict two views of an embodiment of a light source 120 utilizing this principle. The light sources comprises an anode 1010 placed in parallel, and adjacent to, a line of microhollows 1050-1059. In this embodiment, the dielectric 1020, covers a portion of the cathode 1030. The dielectric 1020 is removed or absent all along the extended line of microhollows, allowing the expansion of the gas discharge glow into the uncovered area of the cathode 1030 between the microhollows. The portion of the cathode 1030 covered by the dielectric 1020 defines a rectangular region of exposed cathode 1030 which encloses the microhollows 1050-1059. The longest dimension of the uncovered cathode 1030 region, approximately 1 cm in this embodiment, is substantially greater than the thickness of the dielectric 1020, approximately 50 μm in this embodiment. An anode 1010 is spaced from the cathode 1030 by the dielectric 1020 thickness. The cathode 1030 and anode 1010 are placed in a gas discharge medium. This configuration is driven with appropriate voltage and current levels to create a stable discharge area over a large portion, and in most cases substantially all, of the uncovered region of the cathode.

The uncovered region of the cathode 1030 thus presents a much larger area of light emission that may be advantageously used for fluid treatment applications. The larger emission area of each device allows the use of fewer devices and thereby reduces the physical size of the entire treatment apparatus 101. Use of a light source 120 embodying each of these advantages produces a lower total cost for a fluid treatment system 101.

The microhollows 1050-1059 each may have a width of approximately 150 μm and extend approximately 100 μm into the cathode. While the microhollows 1050 of some embodiments extend only partially through the cathode 1030, in other embodiments, the microhollows 1050 may extend completely through the cathode 1030, allowing discharge gas to pass through the microhollows 1050.

The microhollows may be placed at approximately 1 mm intervals over, in this embodiment, a 1 cm distance. The ratio of the longest dimension of the uncovered region of the cathode 1030 to the thickness of the dielectric 1020 is over 100 to 1 in this embodiment. In the embodiment depicted in FIG. 24, the sequence of microhollows extend in a continuous sequence forming back-and-forth rows over a 1 cm by 1 cm, substantially square area. Thus in the embodiment of FIG. 24, the microhollows are arranged in 1 mm intervals over a total length of approximately 10 cm.

Figure 11:
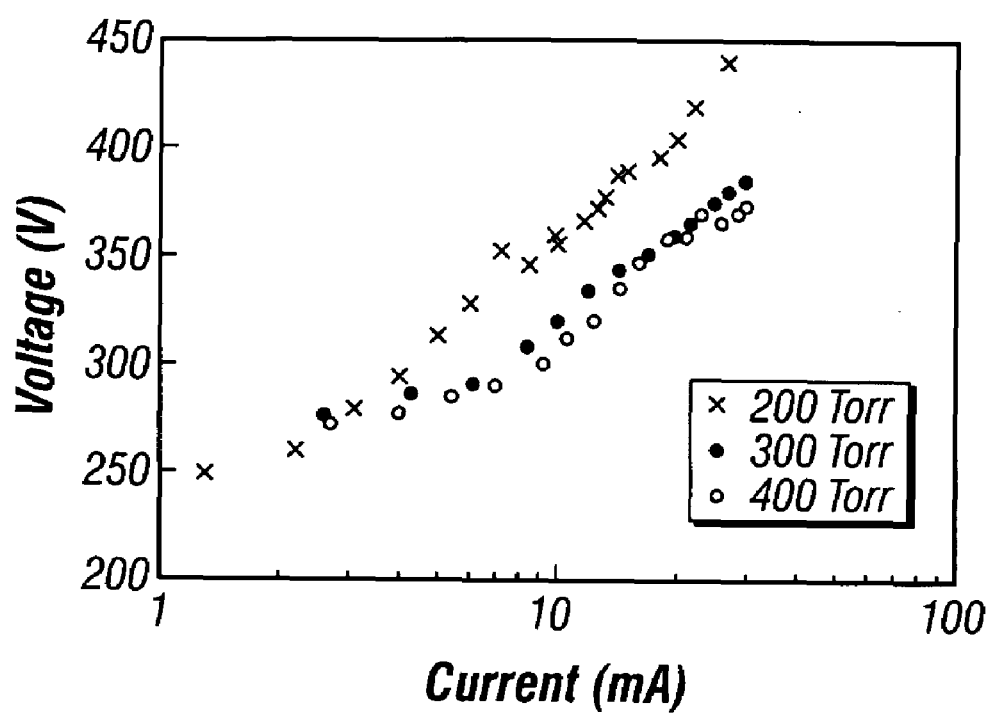
FIG. 11 is a graphical depiction of the current-voltage characteristics of a light source according the embodiment of FIG. 10A.
Figure 12A:
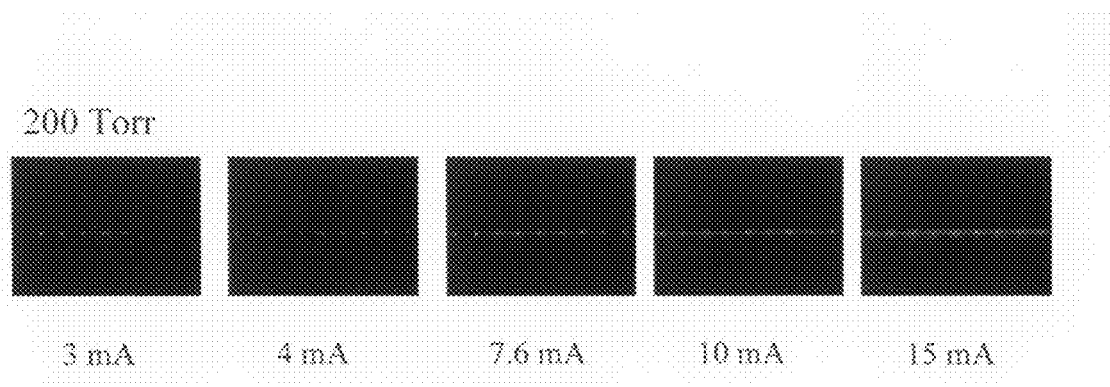
FIGS. 12A-12B are a series of visible-light photographs of the light source embodiment depicted in FIG. 10A operating over a range of currents and pressures.
Figure 12B:
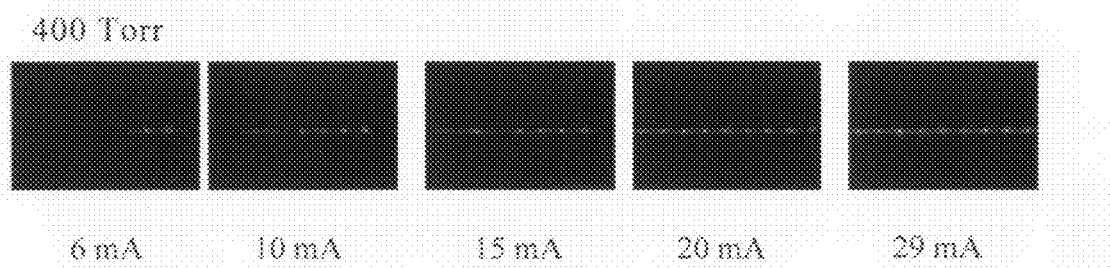

The current-voltage characteristics of the embodiment of FIG. 10A are shown in FIG. 11. As shown for operation at different gas pressures, beyond onset current values, the voltage increases with increasing current, indicating presence of the resistive behavior by the discharges, thus allowing parallel operation without individual ballasts. The onset current values increase in response to increased gas pressure. FIG. 12 depicts a series of top-view visible-light photographs of the embodiment shown in FIG. 11 in operation using gas pressure values of 200 and 400 Torr and increasing current values of 3-15 mA and 6-29 mA. As shown by the sequence of photographs, intensity of the light and homogeneity of the light across the cathode surface increases with current because the light source is operating in the abnormal glow mode.

A light source 120 according to any of the embodiments disclosed herein may form an individual cell within a larger light source. Thus embodiments of light sources according to the present invention may be comprised of a plurality of such cells.

The dielectric or dielectric material 1020 may be a solid layer of any insulating material, for example mica, alumina, or zirconia. The dielectric 1020 may be a heat resistant dielectric material. The dielectric 1020 may also be a liquid or a gas.

A solid dielectric may be connected through pressure or by means of epoxy to the cathode 1030.

The cathode 1030 may be a refractory metal, for example, tungsten, molybdenum, or titanium.

The anode 1010 may also be a refractory metal, for example, tungsten, molybdenum, or titanium. The anode 1010 may be constructed in the form of one or more wires or a plate. Alternatively, the anode 1010 may be constructed as a metal layer applied to the dielectric. An anode 1010 may also be comprised of a metal foil, which is placed on top of the dielectric.

While embodiments according to the present invention are herein discussed using xenon as the gas discharge medium, it is to be appreciated that a variety of different gas discharge media are contemplated by the present invention. Embodiments according to the present invention may be operated in atmospheric air, at atmospheric pressure, to produce line radiation. Particularly advantageous embodiments may be constructed using other excimer gases, such as noble gases. Noble gas media embodiments may include helium, neon, argon, krypton, xenon, and mixtures thereof. Other embodiments are contemplated using mixtures of noble gases and electronegative gases.

Figure 14:
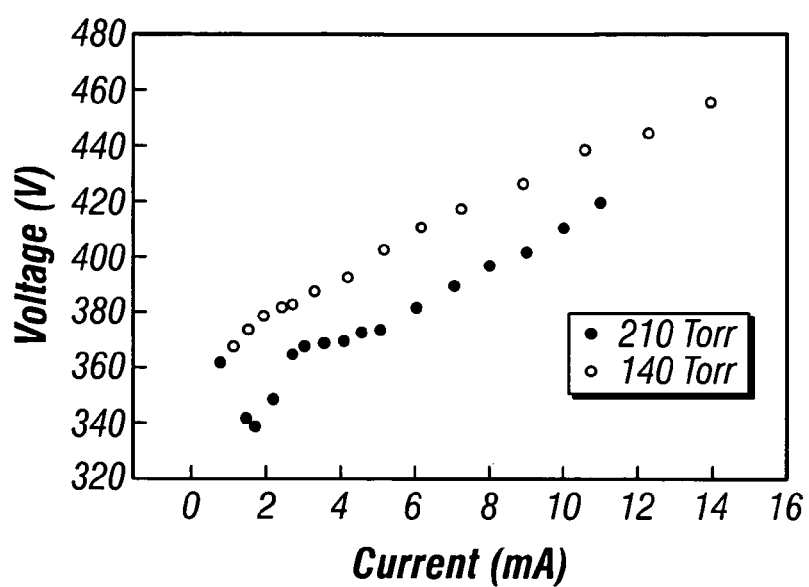
FIG. 14 is a graphical depiction of the current-voltage characteristics of the light source depicted in FIG. 13.
Figure 15:
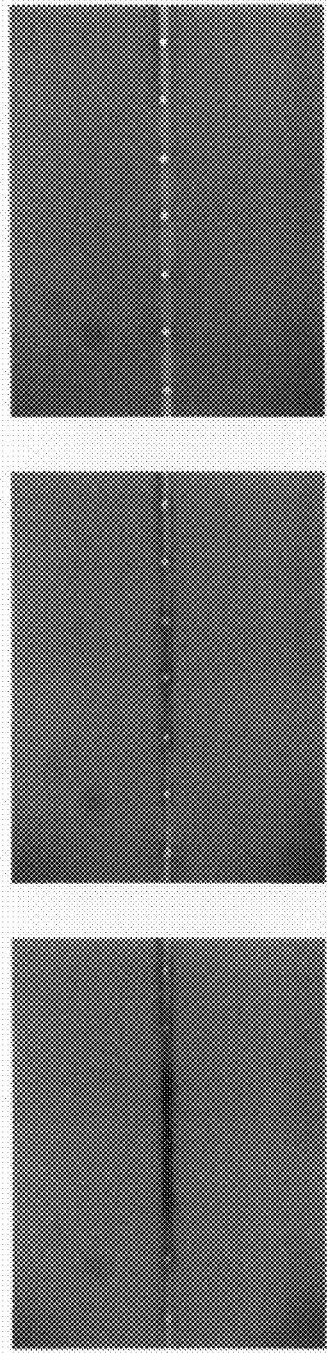
FIG. 15 is a series of visible-light photographs of the light source embodiment depicted in FIG. 13 operating over a range of currents.

A similar light source 120 may be constructed according to the embodiment depicted in FIG. 13. In this embodiment, the dielectric 1320 covers a portion of the cathode 1330 and thus defines an uncovered region of cathode 1330. A linear sequence of microhollows (starting left at 1350) may be in the region of cathode 1330 that is not covered by a dielectric layer 1320. One or more anodes 1310 is placed at both ends of the linear sequence of microhollows. FIG. 14 shows the current-voltage characteristics for a cathode penetrated by seven microhollows and operated in a xenon medium. This embodiment also displays current-voltage characteristics having a positive slope beyond an onset current. The onset current is higher at higher pressure. FIG. 15 is a series of top-view visible light photographs of the embodiment of FIG. 13 showing that the highest intensities are close to each anode 1310 for lower currents. As shown in FIG. 15, with increasing current, however, the light emission becomes increasingly homogeneous over the entire length of the exposed cathode region.

Figure 16B:
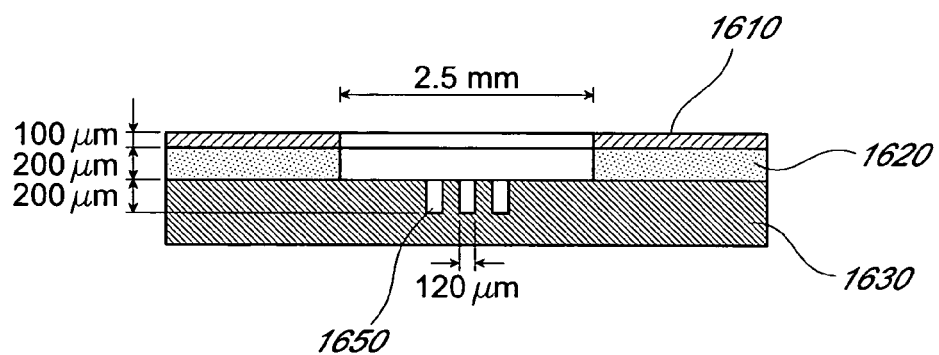
FIG. 16B depicts a cross-sectional view of the embodiment of a light source depicted in FIG. 16A.

Another embodiment of a light source 120, constructed with a larger surface area of emission, is depicted in FIG. 16A and FIG. 16B, in end-on and cross-section views, respectively. A portion of the cathode 1630 is covered by a dielectric layer 1620. This portion of the cathode 1630 may also be covered by the anode 1610. The portion of the cathode 1630 which is covered by the dielectric 1610 defines a circular region of the cathode 1630 which is not covered by the dielectric 1620. In the uncovered region of the cathode 1630 may be a plurality of microhollows, e.g. 1650, arranged in a square pattern.

A light source according to this embodiment may be constructed where the uncovered circular region of the cathode 1630 has a diameter of approximately 2.5 mm. The microhollows 1650 have a diameter of approximately 120 μm, extend 200 μm into the cathode, and are spaced at a center-to-center distance of approximately 0.25 mm. The anode 1610 may be a layer of approximately 100 μm with a dielectric layer of 200 μm. Thus, in this embodiment, the ratio of longest dimension of the uncovered region of the cathode 1630 to the thickness of the dielectric 1620 is approximately 10:1.

Figure 17:
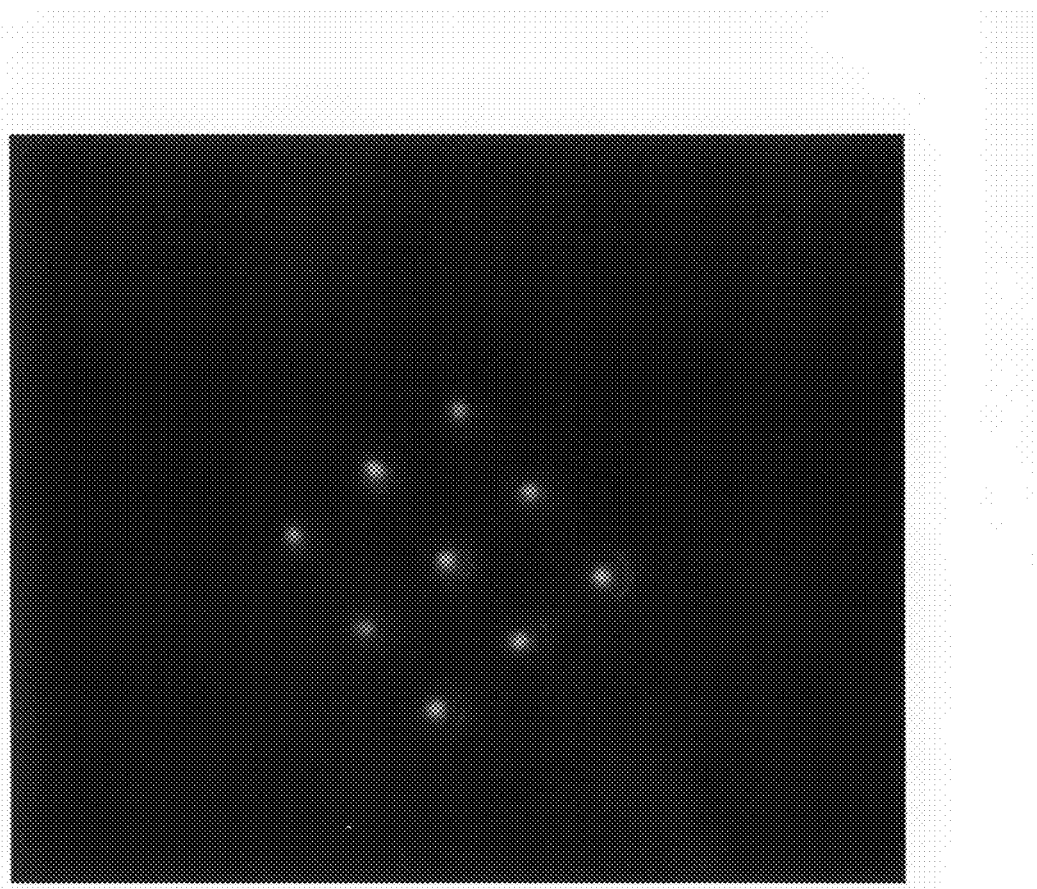
FIG. 17 is a photograph of the embodiment of a light source depicted in FIG. 16A operating in xenon at 300 Torr with a current of 10 mA.

A corresponding visible light photograph of the embodiment depicted in FIG. 16A is shown in FIG. 17. As depicted, the device according to this embodiment, is operating with a current of 10 mA with a xenon medium at 300 Torr. For the nine microhollow device of FIG. 16A, the 10 mA current corresponds to approximately 1 mA per micro-discharge.

Figure 18:
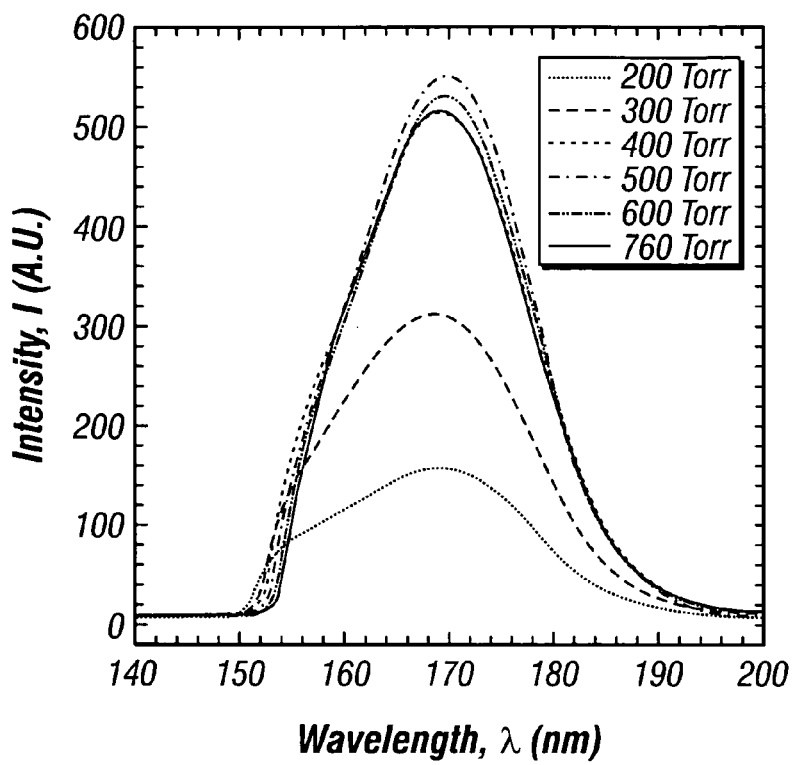
FIG. 18 is a graph of intensity versus wavelength obtained from operation of a light source according to the embodiment depicted in FIG. 16A using a xenon discharge medium.
Figure 19:
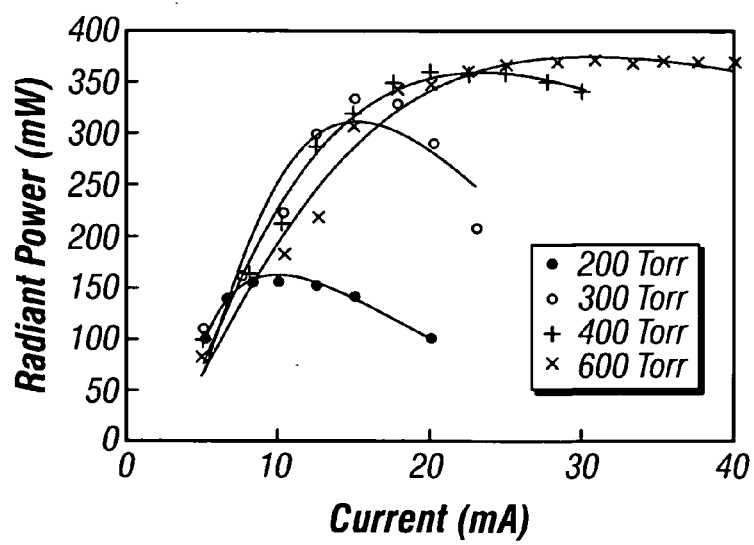
FIG. 19 is a graph of radiative power versus current obtained from operation of a light source according to the embodiment depicted in FIG. 16A using a xenon discharge medium.
Figure 20:
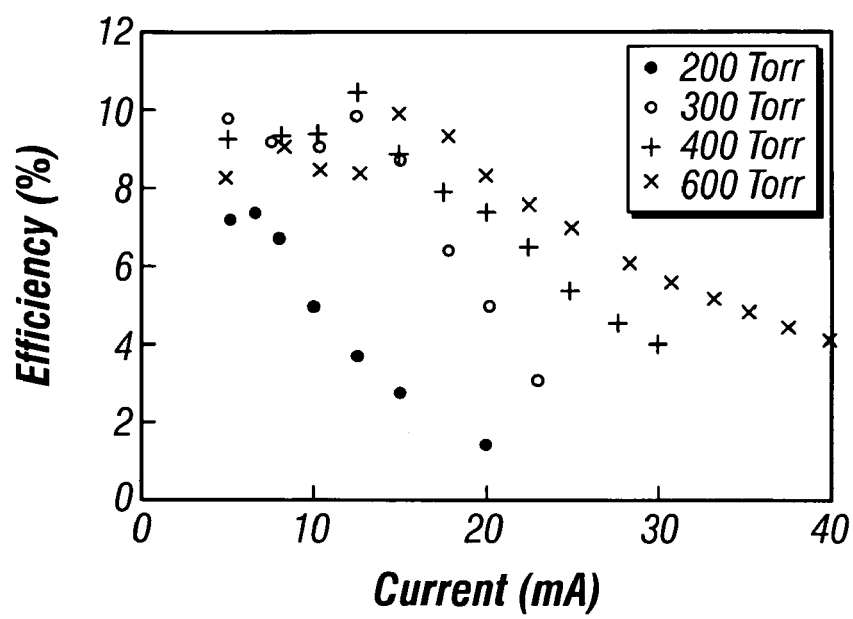
FIG. 20 is a graph of efficiency versus current obtained from operation of a light source according to the embodiment depicted in FIG. 16A using a xenon discharge medium.

FIG. 18 plots observed intensity versus wavelength over a range of pressures from 200-760 Torr for a light source according to an embodiment as depicted in FIG. 16. The radiative excimer power of this embodiment is plotted versus current for a range of pressures in FIG. 19. As shown in FIG. 18, greater power is reached for pressures in excess of 400 Torr. At a given pressure, power increases with current up to the pressure-dependent maximum power. As seen from the plotted values in FIG. 20, the excimer efficiency, the total optical power emitted into 4π divided by the electrical power, reaches its maximum at low current values. As shown, at higher pressures and currents below 10 mA, efficiency reaches 10%.

Figure 21:
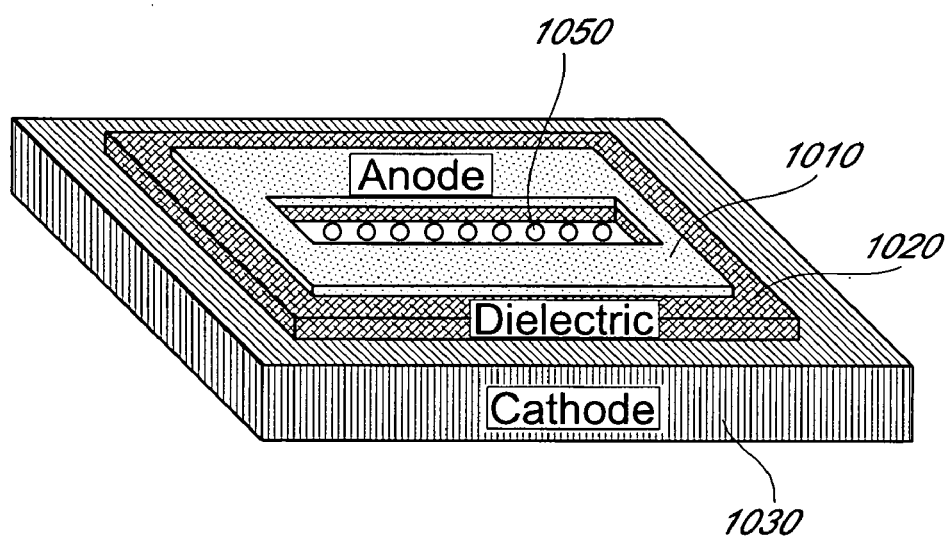
FIG. 21 depicts an isometric view of the light source also depicted in FIG. 10A.
Figure 22:
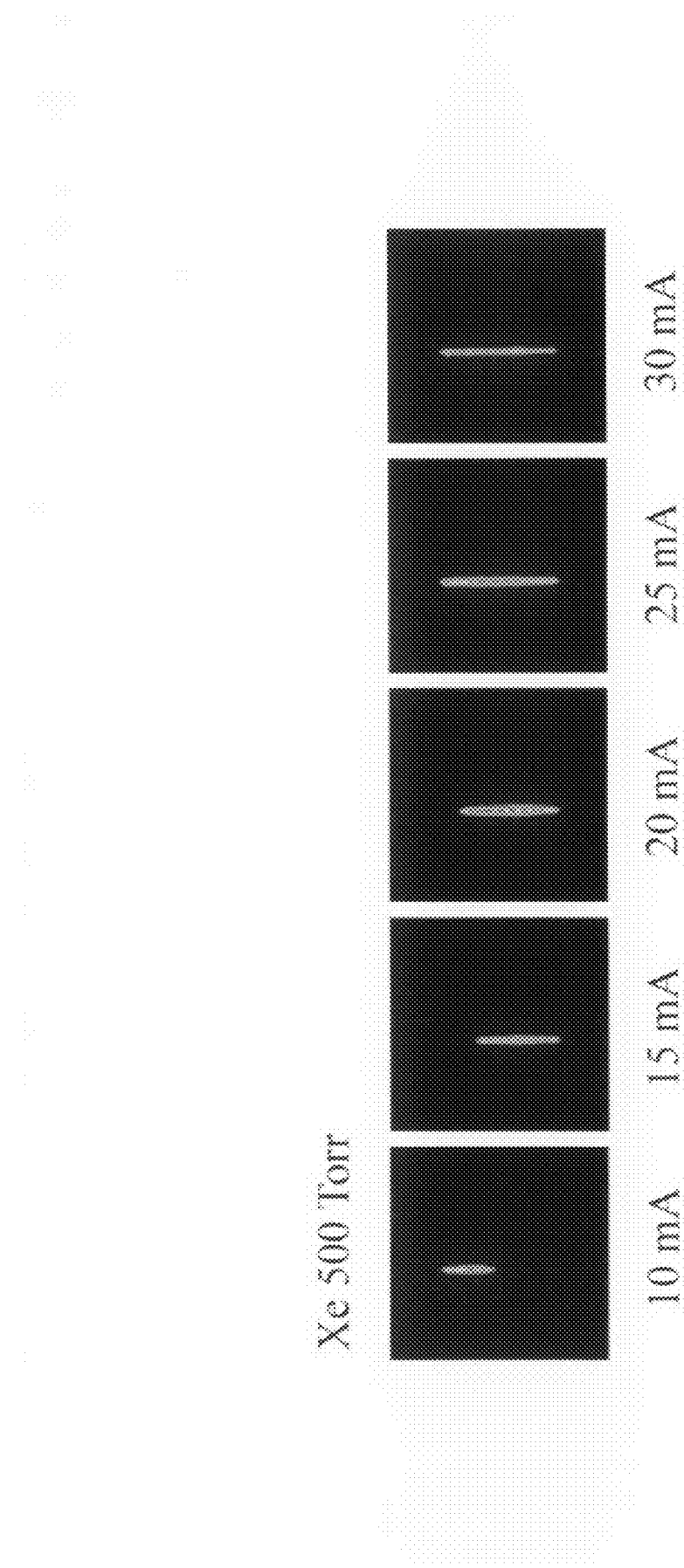
FIG. 22 is a series of visible-light photographs for the light source embodiment depicted in FIG. 21 operating in xenon at 500 Torr.
Figure 23:
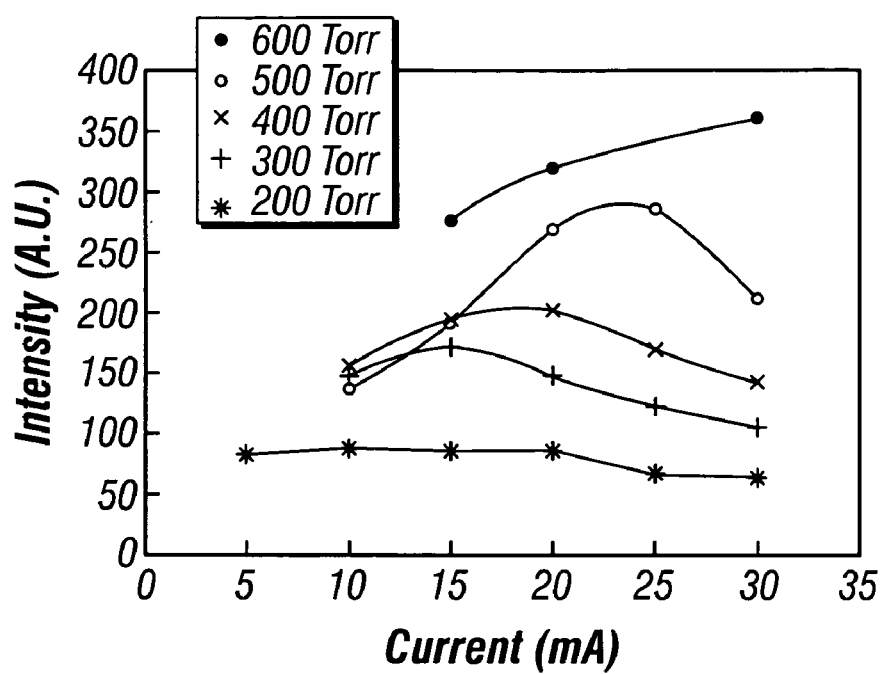
FIG. 23 is a graph of intensity versus current obtained from operation of a light source according to the embodiment depicted in FIG. 21 using a xenon discharge medium.

FIG. 21 depicts an isometric view of an embodiment of a light source 120 similar to that of FIG. 10. The spatial distribution of the line excimer source, obtained using a light source according to the light source embodiment as depicted in FIG. 21 is shown through a series of photographs in FIG. 22. The photographs of FIG. 22, taken from a top view at a wavelength of 172 nm, were obtained using light source gas medium of xenon at a pressure of 500 Torr. The number of micro-discharges which "turn on" increases with current. However, when the current is increased beyond the value where all the discharges have been excited, the excimer source changes. Instead of showing highest intensity values at the position of the microhollows (the spots in FIG. 22) the light intensity from the plasma becomes homogeneous. As shown in FIG. 23, the total excimer power decreases from this point on with current. The critical current for this transition is dependent on pressure. The lower the pressure, the lower the critical current as shown in FIG. 23.

FIGS. 10, 13, 16, and 21 each depict different embodiments according to the present invention where the microhollows are arranged in one or more linear sequences. In such embodiments, the cathode fall and negative glow occupies the space between the microhollows and the dielectric, and generates a homogeneous line plasma source. The positioning of the anode 1010, 1310, 1610 is flexible as long as the anode-cathode distance is not too large compared to the cathode micro-hole diameter. Thus it is to be appreciated that other similar configurations of the anode and the cathode are within the contemplation of the present invention.

Figure 24:
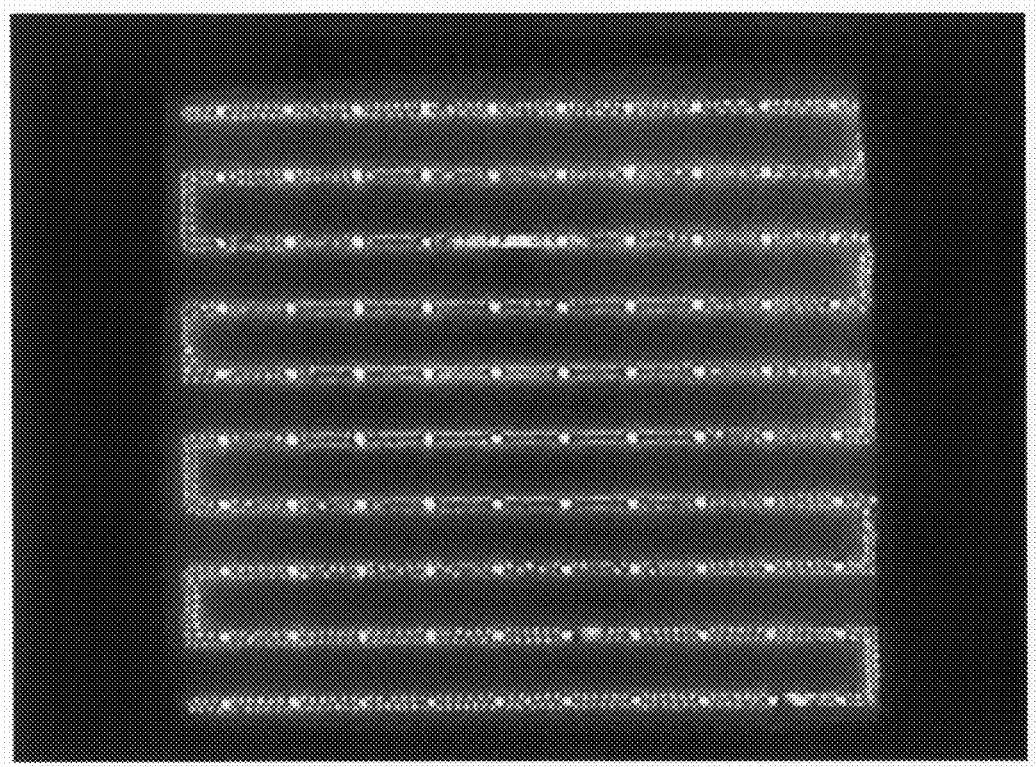
FIG. 24 is a photograph of a light source according to another embodiment of the invention in operation.

A top-view photograph in FIG. 24 shows the resulting radiation pattern from another embodiment of a light source 120. In the embodiment shown in operation in FIG. 24, microhollows are arranged in a sequence of microhollows extend in a continuous sequence forming back-and-forth rows over a 1 cm by 1 cm, substantially square area. The light source depicted has a total size of 1 cm by 1 cm. The light source is shown in operation using xenon at a pressure of 200 Torr and with a current of 60 mA.

Figure 25A:
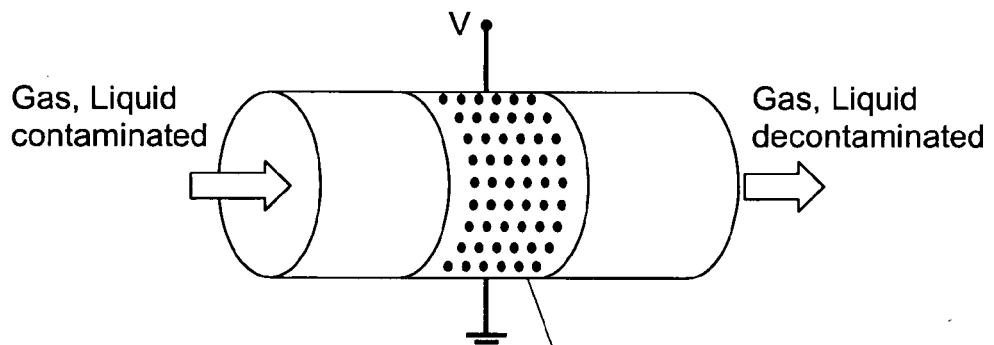
FIG. 25A depicts a side perspective view of an embodiment of a light source according to the present invention in the form of a cylinder.
Figure 25B:
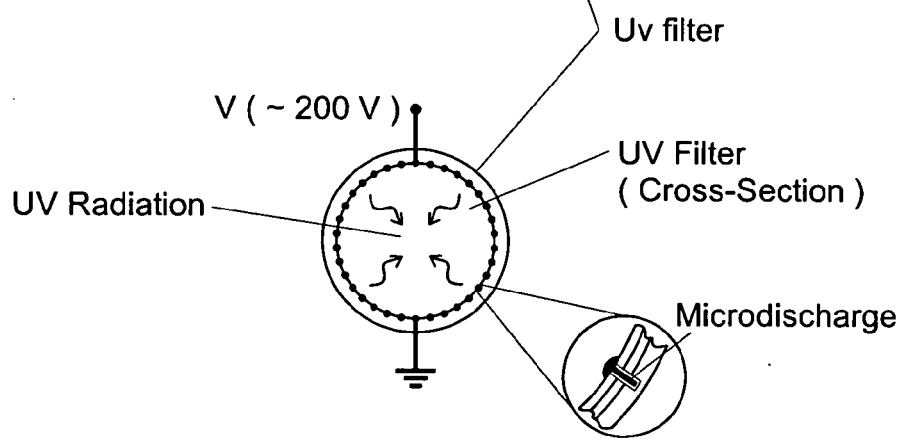
FIG. 25B depicts an end perspective view of the light source embodiment depicted in FIG. 21A.

While an embodiment of a light source 120 as shown in FIG. 24 may be formed on a planar surface, other embodiments may comprise light sources formed on curved surfaces. For example, a light source may be constructed to irradiate a gas or liquid flowing through a tube. This allows the light source to produce light tailored to irradiate a particular target. FIG. 25A and FIG. 25B each depict different perspective views of an embodiment of an excimer lamp according to the present invention configured to continuously irradiate a stream of gas or fluid. The embodiment depicted in FIG. 24 comprises a cylinder with an anode, dielectric, and cathode formed on the surface of the cylinder. An array of microhollows may penetrate each of these layers. Fluid may then be received into, and out of, the cylinder for treatment. In one embodiment of a gas discharge device as depicted in FIG. 25A, a device may be fabricated in form of two half cylinders, enclosing the treated liquid or gas.

3. Device Lifetime Considerations

In commercially use, it is especially advantageous if a light source has a lifetime of 100 hours or more. The erosion characteristics of electrode materials has a strong influence on the life of a discharge cell. Erosion from the dielectric may have a detrimental effect on the device performance as well. Reducing the rate of erosion on the cell materials increases the life of the cell.

Even with the best materials, some erosion of the electrodes, i.e. the anode and cathode, will occur. Cooling the electrodes may reduce the erosion rate. In some embodiments, cooling may be accomplished by conduction of heat from the electrodes. Embodiments of a light source, corresponding to embodiments discussed herein, may be constructed so that the anode and cathode electrodes extend beyond the discharge area and attach to a heat sink.

Similar embodiments may be constructed where only one of the electrodes is attached to a heat sink. In such embodiments, the attached electrode may cool the second electrode through the dielectric. The large area and small thickness of the dielectric helps to overcome the poor heat transfer characteristics inherent in most dielectrics.

External cooling may also be accomplished by flowing gas across the electrodes. A flow of cooling gas also acts to cool the surface of the dielectric of the cell. Embodiment of a gas-cooled light source may be constructed with a gas-tight passage on each side of the discharge device. This structure may allow gas to flow directly through the holes forming the micro-discharge volumes, so that gas cools both the electrodes, the dielectrics, and some of the surrounding area of the device.

This feature is incorporated into the embodiment of FIG. 2, which is also described above. The light source comprises a microhollow cathode discharge element 202, electrode plates 203 and 204, compression ring 205, and window 206. The depicted embodiment produces a single-sided light output, but a double-sided embodiment may be constructed with the same features.

Figure 26A:
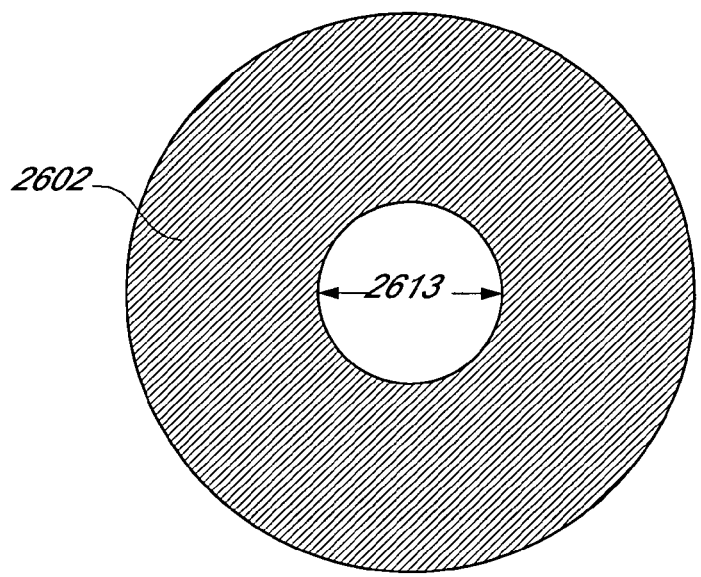
FIG. 26A depicts a top view of simple microhollow according to the present invention.
Figure 26B:
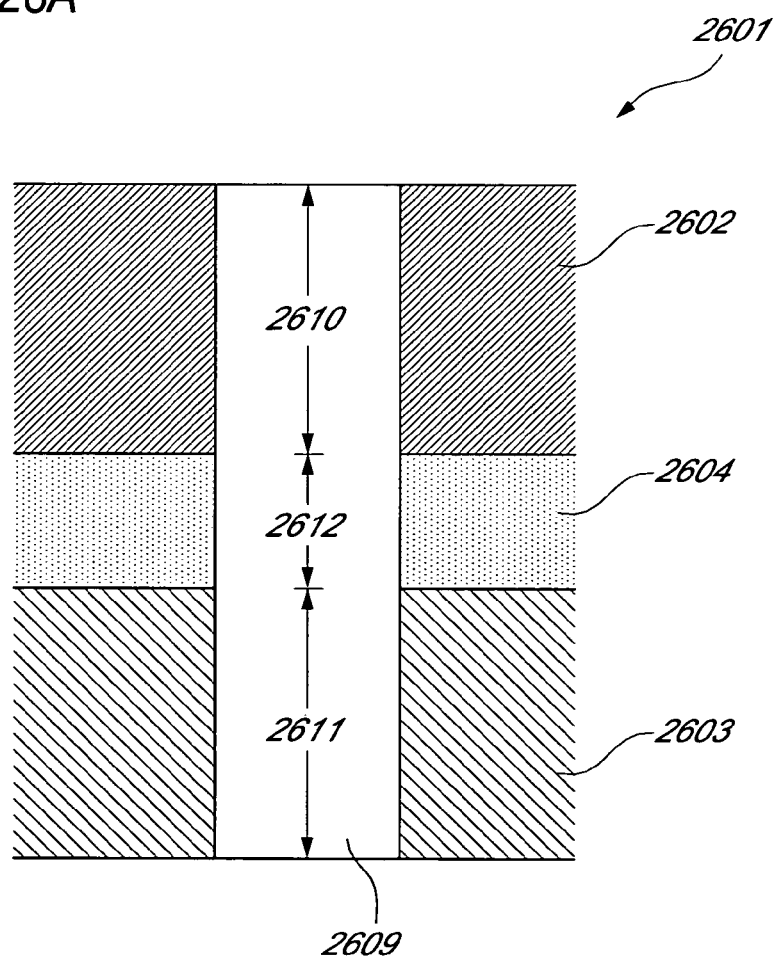
FIG. 26B depicts a side cross-sectional view of the simple microhollow depicted in FIG. 26A.

In embodiments of a light source 120 comprising at least one microhollow, the depth, width, shape, and surface materials of the microhollows may be varied depending on the desired lifetime, performance and cost characteristics of a particular embodiment of a light source 120. As discussed above, a microhollow in an embodiment of a light source 120 may penetrate either partially or completely through a cathode. A light source 120 may comprise a single microhollow cathode discharge which completely penetrates both the anode and cathode as depicted in FIG. 26A and FIG. 26B. The depicted microhollow is formed by a penetration 2609 through the combination of electrodes 2602 and 2603 and the dielectric 2604. The shape of the penetration 2609 may be cylindrical with diameter 2613, as shown in FIG. 26A and FIG. 26B, but other shapes may be used.

The embodiment shown here also has the penetration 2609 through the dielectric 2604 having the same diameter as through the electrodes 2602 and 2603. The portion of the penetration 2609 in the dielectric may be shaped to minimize electric breakdown across the surface of the dielectric. The size and orientation of the openings in and layout of each electrode and the dielectric may be different from one another.

The diameter 2613 of the penetration 2609 and the thicknesses 2610 and 2611 of the electrodes 2602 and 2603, respectively, may be such that the ratio of the diameter 2613 to each of the thicknesses 2602 and 2603 is approximately 1:2. Maintaining this approximate ratio ensures that a potential well is formed which causes the charged particles in the electrical discharge formed in the penetration 2609 of the microhollow 2601 to take a transit path when moving to the opposite electrode (2602 or 2603) which is much longer than the thickness of the electrode 2610 or 2611. This arrangement generates many more electrons than a flat electrode of similar area, with less likelihood of the electrical discharge coalescing to form an arc, which could damage the microhollow.

Figure 27A:
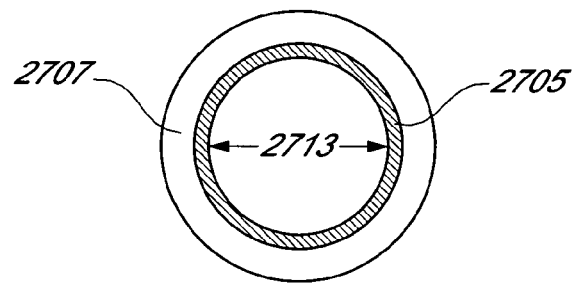
FIG. 27A depicts a top view of microhollow according to the present invention with a fusible link formed around the microhollow.
Figure 27B:
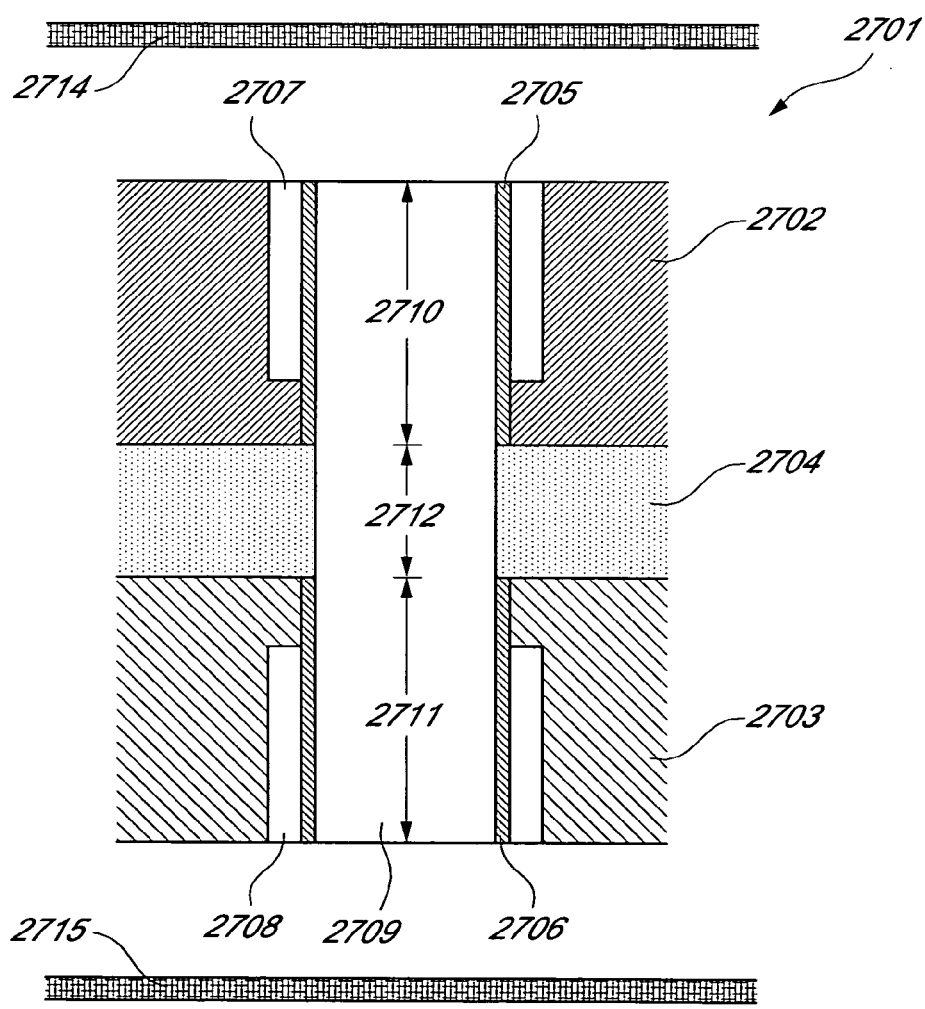
FIG. 27B depicts a side cross-sectional view of the microhollow depicted in FIG. 27A.

In contrast to the simple embodiment depicted in FIG. 26A and FIG. 26B, an embodiment of a light source 120 may comprise a more complex microhollow gas discharge 2701 as depicted in FIG. 27A and FIG. 27B to provide additional lifetime extending features. The microhollow gas discharge 2701 has electrode surfaces 2705 and 2706 that may be formed from different materials than the base material of the electrodes 2702 and 2703. This allows the electrode surfaces 2705 and 2706 to be made from material selected for its resistance to corrosive gases used in the electrical discharge and to erosion by the electrical discharge itself created in the penetration 2709. A high conductivity material may be used for the base material 2702 and 2703 of the electrode, leading to lower resistive losses and less device heating.

The surface material may be comprised of a low work function material, such as barium and cesium, or a dispenser cathode material, which is typically comprised of low work function materials and a refractory metal base.

To further improve device lifetime, in one embodiment, each microhollow may be surrounded by circumferential gaps 2707 and 2708 in the electrodes 2702 and 2703 which penetrate almost all the way through the electrode thicknesses 2710 and 2711. The thickness of the remaining portion of the electrodes 2702 and 2703 is selected such that the excess current drawn by the cell during an arc will heat the electrode material in that section to its evaporation temperature, causing the electrical circuit to be interrupted. This forms a fusible link which prevents a damaged cell from shorting out the remaining cells in an array containing multiple cells.

An embodiment as depicted in FIG. 27B may also comprise surfaces 2714 and 2715, proximal to the discharge 2701. Surface 2714 may act as a window to transmit the light generated by a light source. Surface 2715 may also comprise a window, or it may comprise an opaque material. The surfaces 2714 and 2715 are physically separated from the surface of the cell to form inlet and outlet plenums through which the discharge gas may be circulated. In addition to allowing light to be transmitted from a gas discharge, the circulation of gas through the passages defined by the surfaces 2714 and 2715 cools the cell and enables replacement of the discharge gas, both of which lead to extended life of light source.

It is to be appreciated that while an embodiment of a light source 120 depicted in FIG. 27A and FIG. 27B may include microhollows which feature both circumferential gaps 2707 and 2708 to form a fusible link and a different material forming the electrode surface 2705 and 2706, each of these features is independent. Thus, other embodiments of a light source 120 may comprise microhollows having either circumferential gaps or different materials on the electrode surfaces, but not both features. Still other embodiments of a light source 120 may have a fusible link formed on only one electrode, and thus have only gap 2707 or gap 2708 but not both. In other embodiments of a light source 120 comprising a plurality of microhollows, some of these features may be found in a portion, but not all, of the plurality of microhollows.

4. Light Source Manufacture

A method which allows the generation of large area flat or curved panel excimer lamps is plasma spraying. Plasma spraying is a well-known and understood technique that has been used to form diamond and other coatings. This technique may also be used advantageously to provide a stable coating of dielectric, such as alumina, PSZ, TZP, or aluminum nitride, on the cathode metal. It is also possible to generate triple layers with this method such as molybdenum-zirconia-molybdenum. The pattern in the dielectric of the double layer, or in the surface metal layer and the dielectric of a triple layer can either be fabricated by using masks during the fabrication process or by means of etching methods. Further information regarding plasma spraying techniques is provided by Lugscheider, E. and Weber, T., in Plasma Spraying-An Innovative Coating Technique: Process Variants and Applications, IEEE Transactions on Plasma Science 18 (1990), Volume 6, pp. 968-973, the content of which is hereby incorporated by reference in its entirety.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A system for treating a fluid comprising:
   a treatment chamber coupled to a fluid inlet and a fluid outlet; and
   at least one micro-discharge excimer gas discharge light source wherein the light source is configured to expose a fluid passing through the treatment chamber to radiation
   wherein each light source comprises:
      a cathode having a portion of its surface covered with a dielectric wherein said dielectric has an opening that forms at least one uncovered surface region of said cathode, wherein at least a longest dimension of said surface region is substantially greater than the dielectric thickness;
      an anode spaced from said cathode by at least the dielectric thickness, wherein an edge of said anode is positioned adjacent to an edge of said opening; and
      a gas discharge medium in contact with the anode and the cathode.

2. The system of claim 1, further comprising:
   a gas supply coupled to the light source.

3. The system of claim 1, further comprising:
   a UV detector positioned to receive light from at least one light source, the light having passed through at least a portion of the treatment chamber.

4. The system of claim 1, wherein the gas discharge light source produces light having wavelengths in the range of 100-400 nm.

5. The system of claim 1, wherein the gas discharge light source produces light predominantly having a wavelength of about 193 nm.

6. The system of claim 1, wherein the gas discharge light source produces light predominantly having a wavelength of about 172 nm.

7. The system of claim 1, wherein the fluid consists substantially of water.

8. The system of claim 1, wherein the fluid comprises contaminants that comprise organic compounds.

9. The system of claim 8, wherein at least a portion of the organic compounds are halogenated.

10. The system of claim 1, wherein at least one light source forms part of a chamber seal.

11. A system for treating a fluid comprising:
    a treatment chamber coupled to a fluid inlet and a fluid outlet; and
    at least one micro-discharge excimer gas discharge light source wherein the light source is configured to expose a fluid passing through the treatment chamber to radiation,
    wherein each light source comprises:
       a cathode having a portion of its surface covered with a dielectric so as to define at least one uncovered region of the cathode, wherein at least a longest dimension of said region is substantially greater than the dielectric thickness;
       one or more microhollows penetrating into the uncovered region of the cathode, wherein said microhollows are positioned within said uncovered region and have a longest dimension less than the longest dimension of said uncovered region;
       an anode spaced from the cathode by at least the dielectric thickness; and
       a gas discharge medium in contact with the anode and the cathode.

12. The system of claim 11, wherein a ratio of said longest dimension to the dielectric thickness is approximately 10 to 1.

13. A method for purifying fluids of contaminants comprising:
    producing light using a micro-discharge excimer gas discharge light source, the light having wavelengths in the range of 100 nm-400 nm; and
    exposing a fluid to the light,
    wherein the micro-discharge excimer gas discharge light source used to produce the light comprises:
       a cathode having a portion of its surface covered with a dielectric so as to define at least one uncovered region of the cathode, wherein at least a longest dimension of said region is substantially greater than the dielectric thickness;
       an anode spaced from the cathode by at least the dielectric thickness, wherein an edge of said anode is positioned adjacent to an edge of said opening; and
       a gas discharge medium in contact with the anode and the cathode.

14. The method of claim 13, further comprising:
    flowing a cooling gas through the region of the plasma discharge.

15. The method of claim 13, wherein the gas discharge light source produces light predominantly having a wavelength of about 193 nm.

16. The method of claim 13, wherein the gas discharge light source produces light predominantly having a wavelength of about 172 nm.

17. The method of claim 13, wherein the fluid consists essentially of water.

18. The method of claim 13, wherein the fluid comprises contaminants that comprise organic compounds.

19. The method of claim 18, wherein at least a portion of the organic compounds are halogenated.

20. The method of claim 13, wherein the excimer gas discharge light source used to produce the light further comprises:
    one or more microhollows penetrating into the uncovered portion of the cathode.

21. A gas discharge light source comprising:

a cathode having a portion of its surface covered with a dielectric so as to define at least one uncovered region of the cathode, wherein at least a longest dimension of said region is substantially greater than the dielectric thickness;

one or more microhollows penetrating into the uncovered region of the cathode, wherein said microhollows are positioned within said region and have a longest dimension less than the longest dimension of said uncovered region;

an anode spaced from the cathode by at least the dielectric thickness; and a gas discharge medium in contact with the anode and the cathode.

22. The gas discharge light source of claim 21, wherein a ratio of said longest dimension to the dielectric thickness is at least 10 to 1.

23. A gas discharge light source of claim 21, wherein at least one of the microhollows penetrates completely through the uncovered portion of the cathode.

24. The gas discharge light source of claim 21, wherein the dielectric thickness is approximately the same as the width of at least one of the microhollows.

25. A gas discharge light source of claim 21, wherein the uncovered portion of the cathode comprises a slit.

26. A gas discharge light source of claim 25, wherein the anode extends along one side of the slit.

27. A gas discharge light source of claim 25, wherein a first portion of the anode extends from one end of the slit and a second portion of the anode extends from the opposite end of the slit.

28. A gas discharge light source of claim 21, wherein the uncovered portion of the cathode is substantially circular.

29. The gas discharge light source of claim 21, wherein the anode and the cathode are coupled to a source of direct current.

30. The gas discharge light source of claim 21, wherein the anode and the cathode are coupled to a source of alternating current.

31. The gas discharge light source of claim 21, wherein the anode and the cathode are coupled to a source of pulsed electrical current.

32. The gas discharge light source of the claim 21, wherein the gas is at pressure in the range from 10 Torr to 1500 Torr.

33. The gas discharge light source of claim 21, further comprising:
a housing enclosing the anode and the cathode; and
a window covering a portion of the housing.

34. The gas discharge light source of claim 33, further comprising:
a gas inlet; and
a gas outlet.

35. The gas discharge light source of claim 21, wherein the gas comprises a noble gas.

36. The gas discharge light source of claim 21, wherein the gas is selected from a group consisting of helium, neon, argon, krypton, xenon, and mixtures thereof.

37. The gas discharge light source of claim 21, wherein the gas is a mixture comprising noble gases and electronegative gases.

38. The gas discharge light source of claim 21, wherein the gas comprises atmospheric air.

39. The gas discharge light source of claim 21, wherein the cathode comprises a refractory metal.

40. The gas discharge light source of claim 21, wherein the cathode comprises at least one material selected from the group consisting of molybdenum, titanium and tungsten.

41. The gas discharge light source of claim 21, wherein the dielectric comprises a heat resistant dielectric.

42. The gas discharge light source of claim 21, wherein the dielectric comprises at least one material selected from the group consisting of alumina and zirconia.

43. The gas discharge light source of claim 21, wherein the dielectric has a thickness of 10 micrometers to 200 micrometers.

44. The gas discharge light source of claim 21, wherein the dielectric comprises a coating applied to the cathode.

45. The gas discharge light source of claim 21, wherein the anode comprises a refractory metal.

46. The gas discharge light source of claim 21, wherein the anode comprises at least one material selected from the group consisting of molybdenum, titanium and tungsten.

47. The gas discharge light source of claim 21, wherein the anode comprises at least one plate.

48. The gas discharge light source of claim 21, wherein the anode comprises a metal layer covering at least a portion of the dielectric.

49. A gas discharge device according to claim 21, wherein at least one of the anode and the cathode is thermally coupled to a heat sink.

50. The gas discharge light source of claim 21, further comprising
gas-tight passages transverse to the anode and the cathode;
a gas input port coupled to each passage; and
a gas exhaust port coupled to each passage.

51. The gas discharge light source of claim 21, wherein at least one of the cathode and the anode is positioned to radiate light through a light-transmitting window comprising an inside surface exposed to an excimer-forming gas, and an exterior surface exposed to a target fluid.

52. A gas discharge device according to claim 51, wherein the inside surface is compatible with exposure to the excimer gas and its excited component species.

53. A gas discharge device according to claim 51, wherein the outside surface is compatible with high purity water contact.

54. A gas discharge device according to claim 51, wherein there is a light-transmitting window proximal to both the anode and cathode sides of the device.

55. A gas discharge device according to claim 51, wherein the transmitted light has a predominant wavelength in the range of about 150-400 nm.

56. A gas discharge light source comprising:
a first and second electrode, the first electrode comprising a base electrode material and having a portion of its surface covered with a dielectric so as to define at least one uncovered region of the first electrode, wherein at least a longest dimension of said region is substantially greater than the dielectric thickness,
said second electrode comprising a base electrode material and spaced from the first electrode by at least the dielectric thickness
a gas discharge medium in contact with the first electrode and the second electrode; and
a plurality of microhollows penetrating into at least one electrode wherein an electrode surface material in at least one of the microhollows is a different material than the base electrode material.

57. The gas discharge light source of claim 56, wherein said surface material comprises a refractory metal.

58. The gas discharge light source of claim 56, wherein said surface material comprises at least one material selected from the group consisting of tungsten, molybdenum, and titanium.

59. The gas discharge light source of claim 56, wherein said surface material comprises at least one low work function material.

60. The gas discharge light source of claim 56, wherein said surface material comprises a material selected from the group consisting of barium and cesium.

61. The gas discharge light source of claim 56, wherein said surface material comprises a dispenser cathode material.

62. The gas discharge light source of claim 61, wherein the dispenser cathode material comprises a mixture of a low work function material and a refractory metal base.

63. The gas discharge light source of claim 56, wherein at least one electrode has a fusible link configured to cease conducting electrical current if the current through the fusible link exceeds a specified level for a specified amount of time.

64. The gas discharge light source of claim 56, wherein at least one of the microhollows is surrounded by circumferential gap penetrating a portion of at least one electrode to a thickness of electrode wherein the thickness is selected to form a fusible link.

* * * * *